United States Patent
Burns

(10) Patent No.: US 6,662,549 B2
(45) Date of Patent: Dec. 16, 2003

(54) PROPULSION SYSTEM

(75) Inventor: Alan R. Burns, North Fremantla (AU)

(73) Assignee: Pursuit Dynamics plc, Royston (GB)

( * ) Notice: Subject to any disclaimer, the term of this patent is extended or adjusted under 35 U.S.C. 154(b) by 0 days.

(21) Appl. No.: 10/203,567

(22) PCT Filed: Jun. 7, 2001

(86) PCT No.: PCT/AU01/00677

§ 371 (c)(1),
(2), (4) Date: Aug. 12, 2002

(87) PCT Pub. No.: WO01/94197

PCT Pub. Date: Dec. 13, 2001

(65) Prior Publication Data

US 2003/0013356 A1 Jan. 16, 2003

(30) Foreign Application Priority Data

Jun. 7, 2000 (AU) .............................................. PQ8024

(51) Int. Cl.⁷ ............................................... B63H 11/02
(52) U.S. Cl. .......................................... 60/204; 60/221
(58) Field of Search ...................... 60/204, 221; 440/22, 440/44

(56) References Cited

U.S. PATENT DOCUMENTS

| | | | |
|---|---|---|---|
| 2,971,325 A | | 2/1961 | Gongwer |
| 3,265,027 A | * | 8/1966 | Brown ........................ 114/278 |
| 3,402,555 A | * | 9/1968 | Piper ........................... 60/227 |
| 3,411,301 A | * | 11/1968 | Olsen ........................... 60/221 |
| 3,889,623 A | | 6/1975 | Arnold |
| 4,212,168 A | | 7/1980 | Bouchard et al. |
| 4,718,870 A | | 1/1988 | Watts |
| 4,836,451 A | | 6/1989 | Herrick et al. |
| 5,138,937 A | | 8/1992 | Zietlow |
| 5,344,345 A | * | 9/1994 | Nagata ........................ 440/44 |
| 5,598,700 A | | 2/1997 | Varshay et al. |
| 5,661,968 A | | 9/1997 | Gabriel |
| 5,692,371 A | | 12/1997 | Varshay et al. |

FOREIGN PATENT DOCUMENTS

EP 0 362 052 B1 10/1991

OTHER PUBLICATIONS

Derwent Abstract Accession No. 97–077567/07, WO 9700373, Samkhan, Jan. 3, 1997, whole abstract.

* cited by examiner

Primary Examiner—Ehud Gartenberg
(74) Attorney, Agent, or Firm—Nixon & Vanderhye P.C.

(57) ABSTRACT

A propulsion system (163) having various applications one of which is as a marine drive system for watercraft. The propulsion system (163) comprises a flow passage (173) having an intake (175) for communicating with a source of working fluid such as seawater and an outlet (177). A mixing zone (209) is disposed within the flow passage (173) between the intake (175) and the outlet (177). An injection means including annular nozzle (217) is provided for injecting a hot compressible driving fluid (175) such as steam into the mixing zone (209) in a flow direction towards the outlet (177). The arrangement is such that the interaction between the steam and the seawater in the mixing zone (207) develops a pressure reduction in the mixing zone (207) to cause seawater to be drawn from the source into the mixing zone (207) and propelled towards the outlet (177). A marine drive unit incorporating the propulsion system is also described and claimed, as well as other aspects related to the propulsion system.

88 Claims, 18 Drawing Sheets

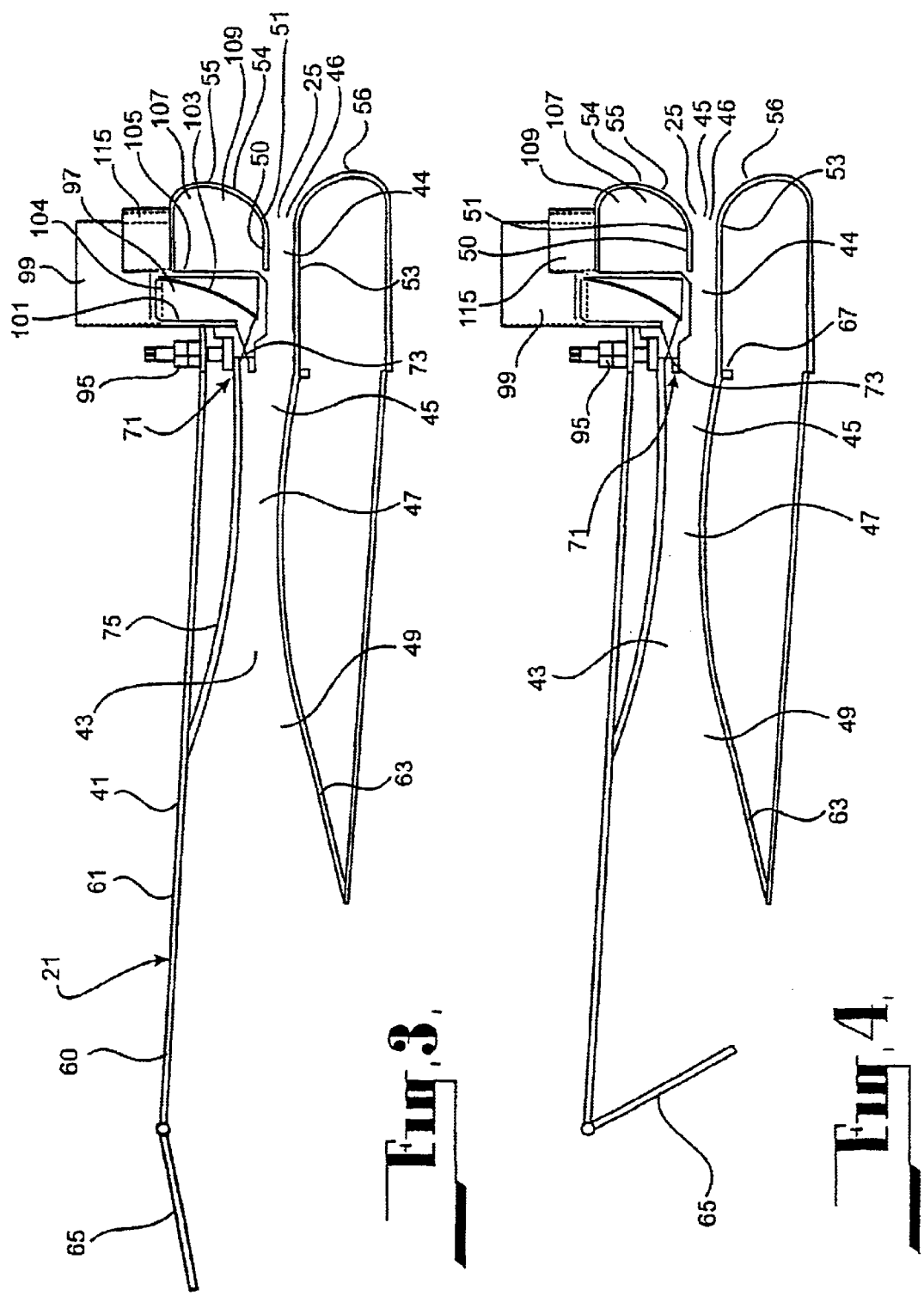

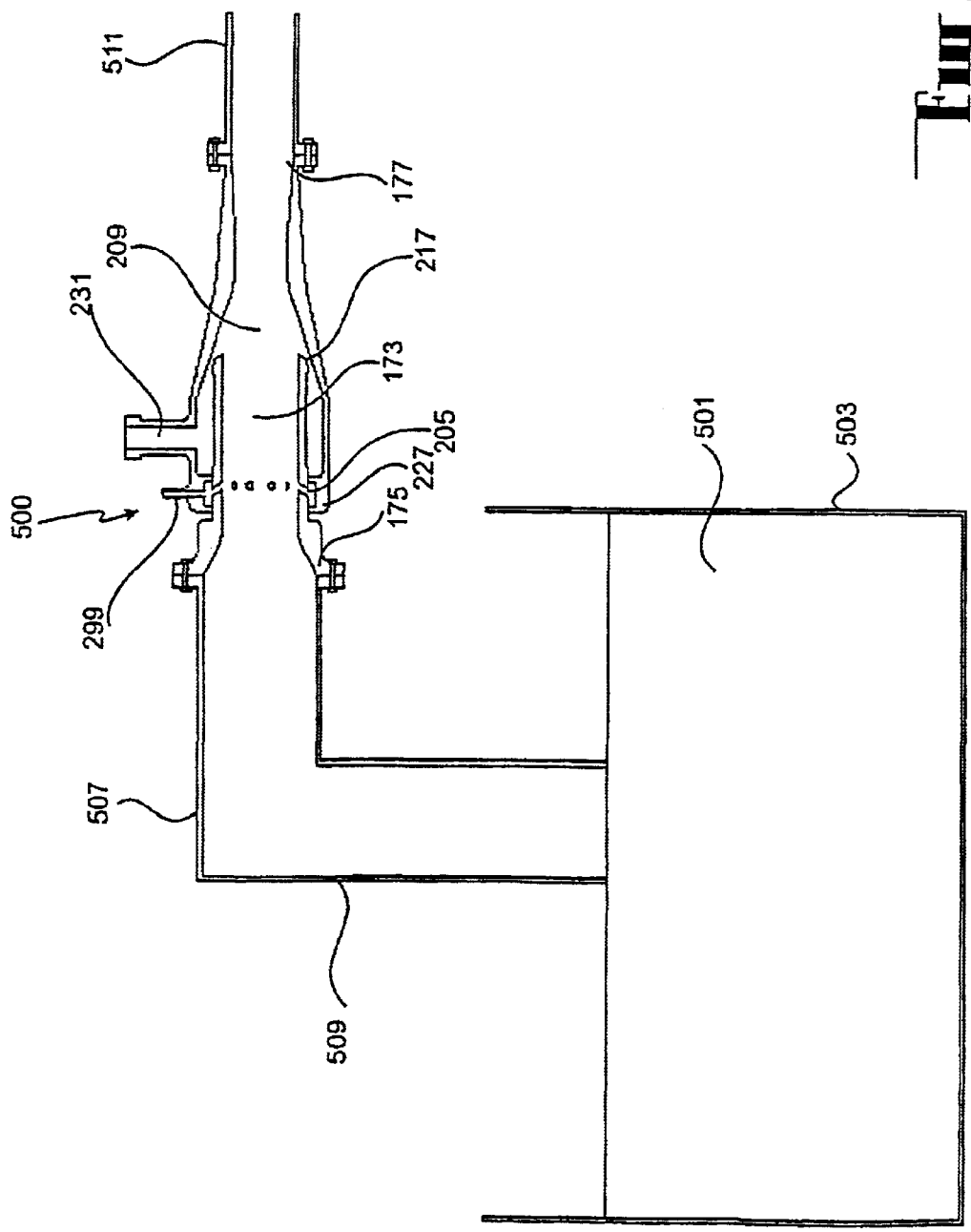

PROPULSION SYSTEM

This application is the US national phase of international application PCT/AU01/00677 filed Jun. 7, 2001 which designated the U.S.

FIELD OF THE INVENTION

This invention relates to a propulsion system.

The invention has been devised particularly, although not solely, as a propulsion system for propelling watercraft. In such an application, a propulsive force for the watercraft typically arises from generation of a jet of water which imparts thrust to the watercraft. However, the propulsion system may have other applications; for example, the propulsion system may be used to propel a stream of liquid in the manner of a pump. Such a use may have particular application in, for example, fire-fighting where a stream of water is propelled onto a fire.

BACKGROUND ART

Various systems are known for propelling watercraft, including motor-driven propellers, and jet propulsion units which produce thrust by discharge of a stream of fluid.

Jet propulsion units are becoming increasingly popular in pleasure and commercial craft because of their shallow draft capability and reduced maintenance requirements in comparison to conventional propeller propulsion system.

U.S. Pat. No. 3,402,555 (Piper) discloses a steam jet nozzle system for propelling watercraft. In the nozzle system, steam is generated and discharged under high pressure to provide propulsion. The nozzle system includes a nozzle having an entrance end and an exit end. Steam enters the nozzle through the entrance end. Raw water from the body of water through which the watercraft is to be propelled is introduced into the nozzle so as to be converted into steam to supplement the steam already in the nozzle. The propulsion is not provided by a jet stream of water but rather by generation and discharge of steam under high pressure.

A known water-jet propulsion unit for watercraft is produced by Hamilton Jet in New Zealand. A water-jet propulsion unit of this type utilises an engine-driven impeller to draw water through a suction foot opening onto the underside of the watercraft and to discharge the water under pressure through a discharge port and thereby propel the watercraft. The impeller is typically driven through a drive shaft from an internal combustion engine. The use of an impeller in a conventional water-jet propulsion system has several disadvantages, including cavitation and other efficiency limitations. Furthermore, there is a significant loss of heat energy from the internal combustion engine used to drive the impeller.

There have been various proposals directed to propulsion of watercraft using a stream of water driven by a high pressure fluid to provide thrust. The high pressure fluid imparts momentum to the water stream which discharges as a water jet. Typically, such proposals involve a duct providing a flow passage having an intake and an outlet, with both the intake and the outlet being open to the water through which the watercraft is to be propelled. The high pressure driving fluid is injected into the duct to contact water in the duct and thereby transfer momentum thereto, causing a stream of water to flow through the duct and discharge as a jet from the outlet to provide propulsive thrust. One such arrangement is disclosed in U.S. Pat. No. 5,344,345 (Nagata) wherein the driving fluid comprises pressurised water and compressed air. Another such arrangement is disclosed in U.S. Pat. No. 5,598,700 (Varshay) where the driving fluid comprises a compressed gas.

The present invention seeks to provide a propulsion system for generating a fluid stream utilising a driving fluid without relying solely on momentum transfer.

DISCLOSURE OF THE INVENTION

According to one aspect of the present invention there is provided a propulsion system comprising a flow passage having an intake for communicating with a source of working fluid and outlet, a mixing zone disposed within the flow passage between the intake and the outlet, means for introducing a hot compressible driving fluid into the mixing zone, whereby interaction between the driving fluid and the working fluid in the mixing zone develops a pressure reduction in the mixing zone to cause working fluid to be drawn from said source into the mixing zone and propelled towards the outlet, and means for aerating the working fluid with an aerating gas prior to interaction of the driving fluid in the mixing zone whereby a three-phase fluid regime is created in the mixing zone by virtue of the interaction of the aerating gas, the working fluid and the driving fluid.

The compressible driving fluid is hot in the sense that it is at a temperature greater than the temperature of the working fluid entering the mixing zone. Typically, the driving fluid is at a temperature of at least 50 C above the temperature of working fluid and preferably more than about 70 C above the temperature of the working fluid.

The interaction between the hot compressible driving fluid and the working fluid involves contact of driving fluid with the working fluid causing rapid cooling of the driving fluid to produce the pressure reduction in the mixing chamber. The rapid pressure reduction is in effect an implosion within the mixing zone. The feature of the driving fluid being compressible allows for a volumetric change upon rapid cooling of the driving fluid.

The interaction between the hot compressible driving fluid and the working fluid preferably also involves momentum transfer from the driving fluid to the working fluid.

It is believed that contact between the driving fluid and the working fluid at the mixing zone within the flow passage may also cause liberation of gases (and oxygen in particular) from the working fluid when the latter is a liquid, and in particular water. The liberated gases may assist in momentum transfer from the driving fluid to the working fluid. Furthermore bubbles of the liberated gases may expand upon being heated in the mixing zone and in doing so apply pressure, and thus work, to the working fluid so further assisting propulsion of the working fluid towards the outlet. Additionally the liberated gases may serve to reduce skin friction between the working fluid and the surrounding boundary of the flow passage.

As alluded to above, the working fluid may comprise water, and said source may comprise a body of water. In the case of a propulsion system for watercraft, the working fluid would comprise water drawn from a body of water in or on which the watercraft is accommodated. In such a case the body of water is typically a lake, a river, an estuary or the sea.

The compressible driving fluid may comprise a substantially gaseous fluid capable of rapid pressure reduction upon exposure to the cooling influence of the working liquid. The gaseous fluid may comprise a gas or a gaseous mixture. Further, the gaseous fluid may have particles such as liquid droplets entrained therein.

The driving fluid may, for example, comprise a condensable vapour such as steam, or exhaust gases from a combustion process such as in an internal combustion engine or a gas turbine.

Steam is a particularly suitable driving fluid, as it can be generated readily and efficiently. Furthermore, steam can be expanded easily and is capable of rapid volume reduction upon condensation to generate the necessary implosion effect.

Steam is a particularly appropriate form of driving fluid where the working fluid is water. In such a case, the source from which the water is drawn as the working fluid may also supply water from which the steam is generated. Additionally, because of the relationship between steam and liquid water, where steam is the evaporated phase of water, there is no undesirable contamination of the water used as the working fluid upon contact with steam used as the driving fluid. This can be important where the propulsion system is used for propelling watercraft through a body of water, as it avoids pollution of the body of water by the driving fluid.

The driving fluid can also be a multi-phase fluid, such as a mixture of steam, air and water droplets. The air and water droplets can be in the form of a mist. Such a multi-phase fluid provides the benefit of increasing the mass flow rate of the driving fluid. Additionally, it serves to increase the density of the driving fluid, bringing it closer to the density of the working fluid to thereby enhance momentum transfer. Momentum transfer is more effective the closer the density the driving fluid is to the density of the working fluid.

During operation of the propulsion system, the driving fluid may be injected into the working fluid on a continual basis or on an intermittent basis such as in a pulsed fashion.

The flow rates of the driving fluid and the working fluid may be selected according to the desired flow rate of working fluid discharging at the outlet. Where the driving fluid is steam and the working fluid is water, mass flow rates of steam to water in a ratio ranging from about 1:10 to 1:150 have been found to be effective within the operating range of the propulsion system. Other ratios may, however, also be effective.

The aerating gas may comprise air or any other appropriate gas or gaseous mixture. Aeration of the working fluid produces a two-phase mixture which has some compressibility. It is believed that the aeration has the effect of lowering the density of the two-phase mixture in comparison to the working fluid, so assisting in the transfer of the working fluid along the flow passage towards the mixing chamber. The lower density of the two-phase mixture is also advantageous as the density is closer to the density of the driving fluid, so assisting momentum transfer. Momentum transfer is increased as the density of the two phase mixture approaches the density of the driving fluid. The aeration process may also reduce skin friction between the working fluid and the surrounding boundary of the flow passage. Additionally, the aeration process may assist in momentum transfer from the driving fluid to the working fluid. Furthermore, bubbles of the aerating gas in the working fluid receive heat from the working fluid, the working fluid itself having been heated through heat exchange as a result of contact with the hot driving fluid. Additionally, there may be direct contact between the hot driving fluid and the bubbles of aerating gas for heat exchange. The heated gas bubbles expand upon exiting the mixing zone and in so doing apply pressure, and thus work, to the working fluid so further assisting propulsion of the working fluid towards the outlet.

The section of the flow passage between the intake and the mixing zone may be of any suitable profile including the profile of a divergent nozzle. Such a profile may assist the aeration process, particularly by drawing the aerating gas into the flow passage.

The aerating gas introduced into the working fluid during the aeration process may be by way of an open draw or it may be regulated in order to achieve the desired level of aeration. An open draw is particularly suitable where the aerating gas is air, as it can simply be drawn from the surrounding environment. The regulation may be achieved in any suitable way such as by restricting the flow of aerating gas (for example by way of a valve) or enhancing flow of the aerating gas by delivering it under pressure.

The extent of aeration required may be selectively varied to influence the extent of thrust produced at the outlet.

Where the working fluid is water and the aerating gas is air, it has been found that the required volume of air to water is not more than about 1:10 by volume. In certain operating conditions, the required volume of air to water can be relatively low, typically in the ratio of about 1:300 by volume.

The section of the flow passage between the intake and the mixing zone may comprise an intake chamber terminating at a discharge opening having a cross-sectional area smaller than the cross-sectional area of the mixing zone at the location where the discharge opening opens onto the mixing zone. Such an arrangement accommodates expansion of the working fluid into the mixing zone, as is particularly beneficial in the case where the working fluid is a liquid which has been aerated.

The section of the flow passage defining the mixing zone preferably progressively contracts in the direction of fluid flow so as to accelerate the flow of working fluid towards the outlet and also assist in the momentum transfer from the driving fluid to the working fluid. Preferably, the mixing zone contracts to a size which creates a choked condition in the fluid flow passage.

The injection means for injecting the driving fluid into the mixing zone may comprise a nozzle means.

The type of nozzle means utilised depends on the propulsion requirements.

In one arrangement, the nozzle means may comprise a single nozzle or a plurality of nozzles located at spaced intervals along the mixing chamber in the direction of flow of the working fluid.

The nozzle means may be configured as a subsonic, sonic or supersonic nozzle. It is however advantageous for the nozzle means to be configured as a supersonic nozzle to provide greater thrust.

The nozzle means is preferably disposed adjacent to a boundary surface of the flow passage.

In one arrangement, the nozzle means may extend around a perimeter of the flow passage. In such an arrangement, the nozzle means may comprise a nozzle passage of annular configuration. The annular passage may, for example, be defined between first and second members selectively movable relative to each other for varying the size of the nozzle flow passage. The first member may define the mixing zone and the second member may define the intake passage opening onto the mixing zone, with the annular nozzle passage being disposed around the discharge opening of the intake passage In another arrangement, the nozzle means may comprise a nozzle passage configured as a slit. In such an arrangement, the slit may be defined between two spaced apart nozzle elements The two nozzle elements may be movable relative to each other for selectively varying the size of the nozzle passage therebetween.

Preferably, a nozzle control means is provided for effecting movement of the nozzle sections relative to each other. Typically, one nozzle element is fixed and the other is selectively movable under the action of the nozzle control means.

The flow passage may have an outlet section extending from the mixing zone and terminating at the outlet, with the outlet section being configured as a diffuser. This arrangement is particularly suitable where the mixing zone contracts to an extent that creates a choked flow condition in the fluid flow, as mentioned previously. Preferably a throat is defined between the mixing zone and the outlet section. Where there is a choked flow condition, it is typically established at the throat. The flow passage may comprise a portion defined between two opposed surfaces, at least one of which is selectively movable relative to the other for varying the cross-sectional area of the portion of the flow passage defined therebetween. Preferably said portion terminates at the outlet and includes the outlet section.

In one arrangement, the two opposed surfaces are planar surfaces.

Preferably, the two opposed surfaces are angularly movable relative to each other. This may be achieved by one of the opposed surfaces being pivotally mounted with respect to the other surface.

Preferably, a control means is provided for selectively controlling relative movement between the two opposed surfaces.

Means may be provided for selectively diverting the driving fluid thereby causing it to flow in a reverse direction along the flow passage to discharge outwardly through the intake. In this way, the propulsion system may be utilised to provide reverse thrust.

Means may be provided for selectively varying the size of the intake.

According to a further aspect of the invention there is provided a propulsion system comprising a flow passage having an intake for communicating with a source of working liquid and an outlet, a mixing zone disposed within the flow passage between the intake and outlet, aeration means for aerating the working liquid with an aerating gas before delivery thereof to the mixing chamber, and a nozzle means for introducing a jet of hot compressible driving fluid into the mixing zone in a flow direction towards the outlet whereby a three-phase fluid regime is created in the mixing zone by virtue of the interaction of the aerating gas, the working liquid and the driving fluid, and whereby interaction between the driving fluid and the working liquid in the mixing zone develops a pressure reduction relative to the intake pressure to cause working liquid to be drawn from said source into the mixing zone and propelled towards the outlet.

Aeration of the working liquid produces a two-phase mixture which has some compressibility.

According to a further aspect of the invention there is provided a propulsion system comprising a flow passage having an intake for communicating with a source of working fluid and an outlet, a mixing zone disposed within the flow passage between the intake and outlet, and a nozzle means for injecting a condensable vapour into the mixing zone in a flow direction towards the outlet, whereby interaction between the condensable vapour and the working liquid in the mixing zone causes the vapour to condense providing a volume reduction to create a suction effect to cause working liquid to be drawn from said source into the mixing zone and propelled towards the outlet, and means for aerating the working fluid with an aerating gas prior to interaction of the driving fluid in the mixing zone whereby a three-phase fluid regime is created in the mixing zone by virtue of the interaction of the aerating gas, the working fluid and the condensable vapour.

According to a still further aspect of the invention there is provided a propulsion system for a watercraft accommodated on or in a body of water, the propulsion system comprising a flow passage having an intake for communicating with the body of water and an outlet, a mixing zone disposed within the flow passage between the intake and outlet whereby a stream of water drawn from the body of water through the intake as a working fluid can enter the mixing zone, and an injection means for injecting a hot compressible driving fluid into the mixing zone in a flow direction towards the outlet, whereby interaction between the driving fluid and the water in the mixing zone.

The propulsion system can be provided at any suitable location on the watercraft. It is particularly convenient to locate the propulsion system in such a way that the outlet is located adjacent the stern of the watercraft so as to provide stern thrust to the watercraft. However, the propulsion system can be so located as to provide bow thrust to the watercraft, or indeed it can be located such that the outlet discharges at any location between the bow and the stern of the watercraft.

There may be a particular advantage in locating the outlet to discharge into a region below the hull of the watercraft in that resultant aeration of water adjacent the hull of the watercraft reduces the frictional drag effect on the watercraft.

According to a still further aspect of the invention there is provided a watercraft having a propulsion system according to any one of the aspects of the invention as detailed above.

According to a still further aspect of the invention there is provided a propulsion system for a watercraft accommodated on or in a body of water, the propulsion system comprising a flow passage having an intake for communicating with the body of water and an outlet, a mixing zone disposed within the flow passage between the intake and outlet whereby a stream of water drawn from the body of water through the intake can enter the mixing zone, and for introducing a hot compressible driving fluid into the mixing zone, whereby interaction between the driving fluid and the water in the mixing zone develops a zone of reduced pressure to cause a stream of water to be drawn from the body of water into the mixing zone and propelled towards the outlet, and means for aerating the working fluid with an aerating gas prior to interaction of the driving fluid in the mixing zone whereby a three-phase fluid regime is created in the mixing zone by virtue of the interaction of the aerating gas, the water and the driving fluid, the propulsion system being devoid of an impeller or other mechanical device for generating fluid flow along the flow passage to provide thrust at the outlet.

Preferably, both the intake and outlet of the propulsion system of the watercraft are so positioned as to in use open into the body of water on or in which the watercraft is accommodated.

According to a still further aspect of the invention there is provided a drive system for a watercraft, the drive system comprising a propulsion system which is as hereinbefore defined and which may additionally include any of the preferred features detailed above.

According to a still further aspect of the invention there is provided a drive system for a watercraft adapted to be accommodated on or in a body of water, the drive system comprising a steam generator for generating a supply of steam, and a propulsion system, the propulsion system comprising a flow passage having an intake for communicating with the body of water and an outlet, a mixing zone disposed within the flow passage between the intake and the outlet whereby a stream of water drawn from the body of water through the intake can enter the mixing zone, and an injection means for injecting steam generated by the steam generator into the mixing zone in a flow direction towards the outlet, whereby interaction between the steam and the water in the mixing zone causes water to be drawn from the body of water into the mixing zone and propelled towards the outlet, and means for aerating the water with an aerating gas prior to interaction of the steam in the mixing zone whereby a three-phase fluid regime is created in the mixing zone by virtue of the interaction of the aerating gas, the water and the steam.

The drive system may further comprise a heat recovery system adapted to recover remnant heat in the water arising from contact with the steam.

Preferably, the steam generator comprises a boiler adapted to generate heat from combustion of a fuel, the heat recovery means being adapted to also recover at least some remnant heat in combustion gases from the boiler.

According to a still further aspect of the invention there is provided a method of generating a fluid flow comprising the steps of: providing a flow passage having an intake and an outlet; locating the intake of the flow passage to communicate with a source of primary fluid from which the fluid flow is to be established; and introducing a driving fluid into the flow passage for interacting with primary fluid in the flow passage to develop a pressure reduction at a zone in the flow passage to cause primary fluid to be drawn from said source into said zone and propelled towards the outlet; and further comprising the step of aerating the primary fluid with an aerating gas prior to the introduction of the driving fluid into the primary fluid whereby a three-phase fluid regime is created in the flow passage by virtue of the interaction of the aerating gas, the primary fluid and the driving fluid.

According to a still further aspect of the invention there is provided a method of generating a fluid flow comprising the steps of: providing a flow passage having an intake and an outlet; locating the intake of the flow passage to communicate with a source of fluid from which the fluid flow is to be established; and injecting a condensable vapour into the flow passage for interacting with fluid therein to provide a volume reduction upon condensation of the vapour to create a suction effect at a zone in the flow passage to cause fluid to be drawn from said source into said zone and propelled towards the outlet; and further comprising the step of aerating the fluid with an aerating gas prior to the introduction of the condensable vapour into the fluid whereby a three-phase fluid regime is created in the flow passage by virtue of the interaction of the aerating gas, the fluid and the condensable vapour.

According to a still further aspect of the invention there is provided a method of propelling a watercraft through a body of water, the method comprising the steps of: providing the watercraft with a flow passage having an intake and an outlet both opening onto the body of water; and introducing a driving fluid into the flow passage to develop a pressure reduction at a zone in the flow passage to cause water from the body of water to be drawn through the inlet into said zone and propelled towards the outlet as a stream for propelling the watercraft; and further comprising the step of aerating the water with an aerating gas prior to the introduction of the driving fluid into the water whereby a three-phase fluid regime is created in the flow passage by virtue of the interaction of the aerating gas, the water and the driving fluid.

According to a still further aspect of the invention there is provided a method of propelling a watercraft through a body of water, the method comprising the steps of: providing the watercraft with a flow passage having an intake and an outlet both opening onto the body of water; and introducing a condensable vapour such as steam into the flow passage to provide a volume reduction upon condensation of the vapour and thereby create a suction effect at a zone in the flow passage to cause water from the body of water to be drawn through the inlet into said zone and propelled towards the outlet as a stream for propelling the watercraft; and further comprising the step of aerating the water with an aerating gas prior to the introduction of the condensable vapour into the water whereby a three-phase fluid regime is created in the flow passage by virtue of the interaction of the aerating gas, the water and the condensable vapour.

Each aspect of the invention as set forth hereinbefore may further comprise a heat recovery system for recovering heat from a heat source, the heat recovery system comprising a refrigerant circuit having a heat exchanger exposed to the heat source for extracting heat therefrom to vapourise a refrigerant in the refrigerant circuit, and means associated with the refrigerant circuit for converting heat energy in the vapourised refrigerant to torque.

The means for converting heat energy in the refrigerant vapor to torque may comprise an impeller in the refrigerant circuit upon which the refrigerant vapor acts.

According to a still further aspect of the invention, there is provided a drive system for a watercraft accommodated on or in a body of water, the drive system comprising a propulsion system as set forth hereinbefore, a boiler for generating a supply of steam, the boiler having a combustion chamber and an exhaust passage along which exhaust gases from the combustion chamber are discharged, and a heat recovery system for recovering remnant heat in the exhaust gases, the heat recovery system comprising a refrigerant circuit having a heat exchanger exposed to the exhaust passage for extracting heat from the exhaust gases to vapourise a refrigerant in the refrigerant circuit, and means associated with the refrigerant circuit for converting heat energy in the vapourised refrigerant to torque.

According to a still further aspect of the invention, there is provided a drive system for a watercraft accommodated on or in a body of water, the drive system comprising a propulsion system as set forth hereinbefore, and a heat recovery system for recovering remnant heat in the water flowing along the flow passage after the introduction of steam into the water, the heat recovery system comprising a refrigerant circuit having a heat exchanger exposed to the flow passage for extracting heat from water flowing along the flow passage to vapourise a refrigerant in the refrigerant circuit, and means associated with the refrigerant circuit for converting heat energy in the vapourised refrigerant to torque.

According to a still further aspect of the invention, there is provided a drive system for a watercraft accommodated on or in a body of water, the drive system comprising a boiler for generating a supply of steam, the boiler having a combustion chamber and an exhaust passage along which exhaust gases from the combustion chamber are discharged, a propulsion system as set forth hereinbefore, and a heat recovery system for recovering remnant heat in the exhaust gases and in the water flowing along the flow passage after introduction of steam into the water, the heat recovery system comprising a refrigerant circuit having a heat exchanger exposed to the exhaust passage and the flow passage for extracting heat therefrom to vapourise a refrigerant in the refrigerant circuit, and means associated with the refrigerant circuit for converting heat energy in the vapourised refrigerant to torque.

The refrigerant circuit may include an evaporator having a first portion thereof exposed to the exhaust passage for extracting heat from the combustion gases passing thereal-ong and a second portion exposed to the flow passage for extracting heat from water flowing therealong.

According to a still further aspect of the invention there is provided a nozzle means in accordance with a propulsion system as set forth hereinbefore having an inlet, an outlet and a flow passage extending between the inlet and the outlet, characterised in that the size of the flow passage is selectively variable.

The nozzle means may comprise a convergent section, a throat section and a divergent section, the convergent section extending from the inlet to the throat section and the divergent section extending from the throat section to the outlet.

The nozzle means may comprise a nozzle structure comprising two elongate elements between which the nozzle passage is defined.

Preferably, the two nozzle elements are movable relative to each other for selectively varying the size of the flow passage therebetween.

According to a still further aspect of the invention there is provided a propulsion system comprising a flow passage having an intake for communication with a source of working fluid and an outlet, a mixing zone disposed within the fluid passage between the intake and the outlet, a nozzle means for introducing a jet of driving fluid into the mixing zone in a flow direction towards the outlet, whereby interaction between the driving fluid and the working fluid in the mixing zone causes working fluid to be drawn from the source into the mixing zone and propelled towards the outlet, the nozzle means having a nozzle passage of selectively variable size, and means for aerating the working fluid with an aerating gas prior to interaction of the driving fluid in the mixing zone whereby a three-phase fluid regime is created in the mixing zone by virtue of the interaction of the aerating gas, the working fluid and the driving fluid.

According to a still further aspect of the invention there is provided a drive system for a watercraft adapted to be accommodated on or in a body of water, the propulsion system comprising a flow passage having an intake for communicating with the body of water and an outlet, a mixing zone disposed within the flow passage between the intake and the outlet whereby a stream of water drawn from the body of water through the intake can enter the mixing zone, and a nozzle means for introducing a jet of driving fluid into the mixing zone in the flow direction towards the outlet, whereby interaction between the driving fluid and water causes water to be drawn through the intake from the body of water and propelled towards the outlet, the nozzle means having a nozzle passage of selectively variable size, and means for aerating the working fluid with an aerating gas prior to interaction of the driving fluid in the mixing zone whereby a three-phase fluid regime is created in the mixing zone by virtue of the interaction of the aerating gas, the water and the driving fluid.

According to a still further aspect of the invention there is provided a drive system for a watercraft adapted to be accommodated on or in a body of water, the drive system comprising a steam generator for generating a supply steam, a propulsion system comprising a flow passage having an intake for communication with the body of water and an outlet, a mixing zone disposed within the flow passage between the intake and outlet whereby a stream of water drawn from the body of water through the intake can enter the mixing zone, and a steam nozzle means for introducing steam into the mixing zone in a flow direction towards the outlet, whereby interaction between the steam and the water causes water to be drawn into the flow passage through the intake and propelled towards the outlet, the steam nozzle means having a flow passage of selectively variable size, and means for aerating the working fluid with an aerating gas prior to interaction of the driving fluid in the mixing zone whereby a three-phase fluid regime is created in the mixing zone by virtue of the interaction of the aerating gas, the water and the steam.

BRIEF DESCRIPTION OF THE DRAWINGS

The invention will be better understood by reference to the following description of several specific embodiments thereof as shown in the accompanying drawings:

FIG. 3 is a schematic side view of a propulsion system forming part of the drive system, with a reversing flap forming part of the propulsion system shown in a first position;

FIG. 4 is a view similar to FIG. 3 with the exception that the reversing flap is shown in a second position;

FIG. 20 is a schematic view of a propulsion system according to an eleventh embodiment functioning as a pump.

BEST MODE(s) FOR CARRYING OUT THE INVENTION

Figure 1:
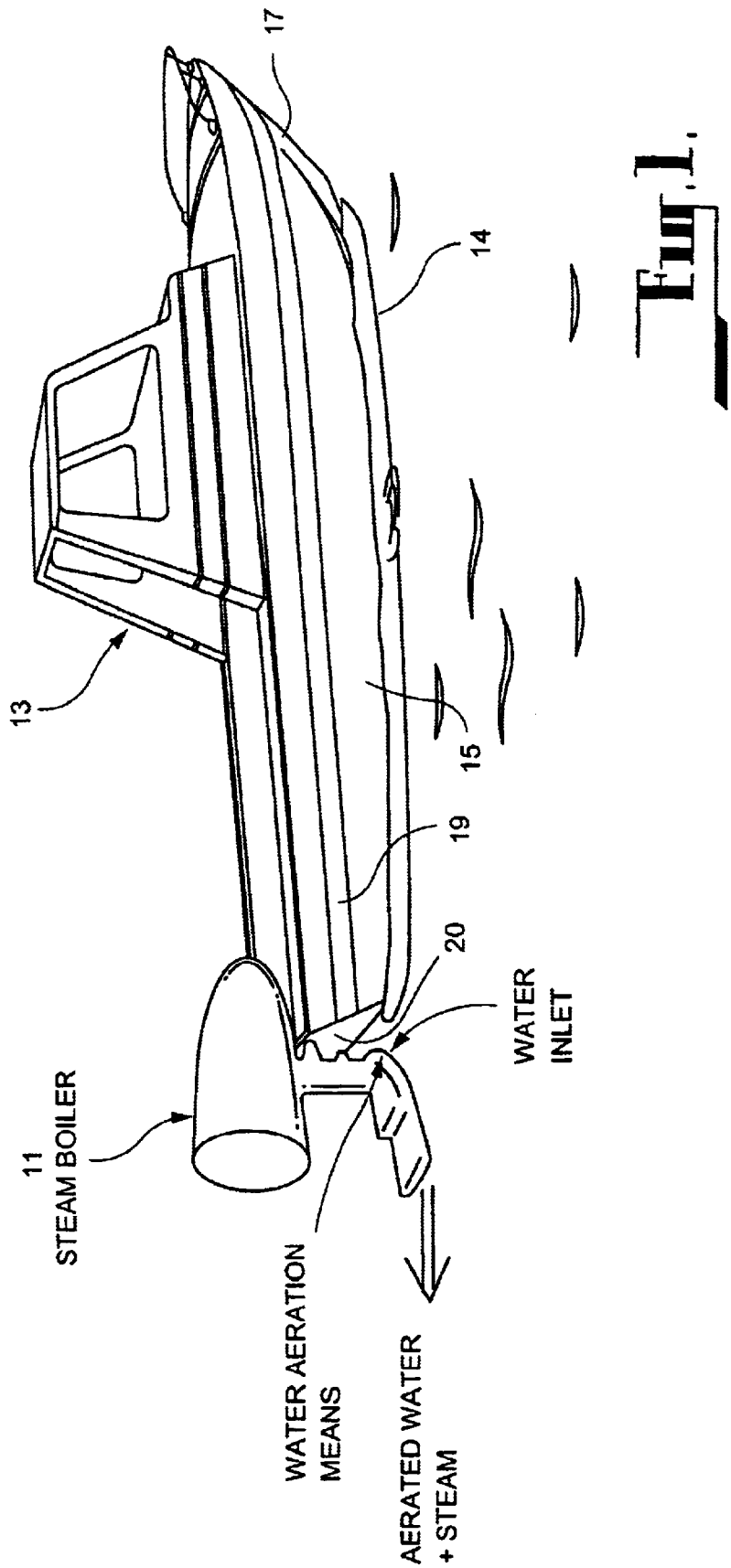
FIG. 1 is a schematic view illustrating a drive system according to a first embodiment installed on a watercraft.
Figure 2:
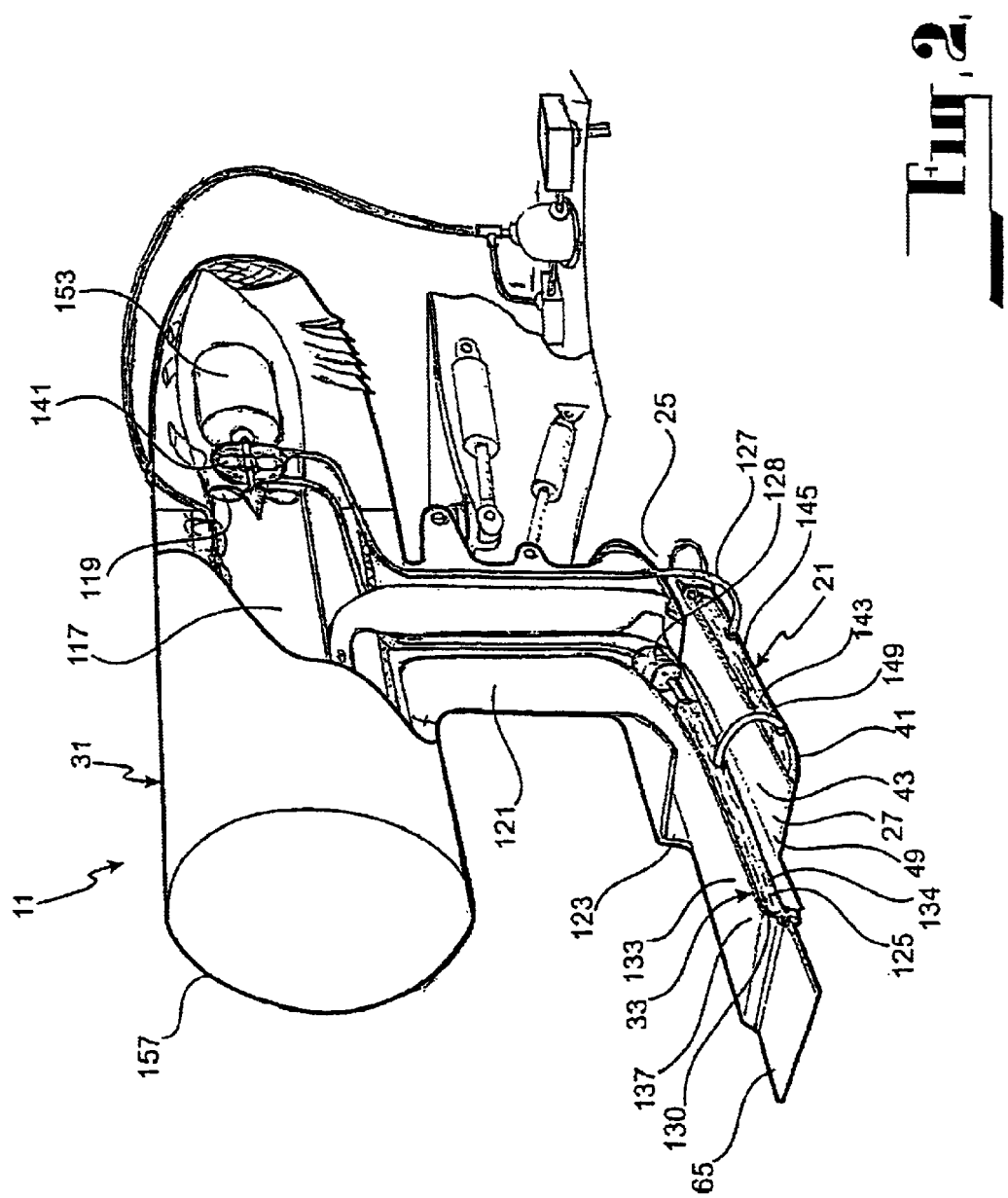
FIG. 2 is a partly cut-away schematic perspective view of the drive system.

Referring to FIGS. 1 to 8 of the drawings, the first embodiment is directed to a drive system 11 for a watercraft 13 in the form of a boat having a hull 15, a bow 17 and a stern 19 including a transom 20. In this embodiment, the drive system 11 is in the form of an outboard motor which is mounted on the transom 20 of the boat 13, although it should be appreciated that other arrangements are possible including an on-board drive system.

The drive system 11 utilises a propulsion system 21 in accordance with the invention, as will be described.

The propulsion system 21 has an intake 25 and an outlet 27, both of which are located below the water line of the boat 13 so as to be submerged in a body of water 14 on which the boat 13 is afloat. For the purposes of this description; the boat 13 is of a type operational at sea and the water will therefore be referred to as seawater. Seawater is drawn into the intake 25 and discharged through outlet 27 so as to impart thrust to propel the boat 13, as will be explained later.

The propulsion system 21 uses a driving fluid, which in this embodiment is steam.

The drive system 11 includes a steam generator 31 for generating the steam. The steam is generated in the steam generator 31 from heat produced upon combustion of a fuel such as a gas.

The drive system 11 further includes a heat recovery system 33 to recover remnant heat from the steam after momentum transfer to the seawater. Additionally, the heat recovery system 33 recovers some of the remnant heat in spent combustion gases exhausting from the steam generator 31.

The propulsion system 21 comprises a body structure 41 defining a flow passage 43 extending from the intake 25 to the outlet 27. The flow passage 43 includes an intake section 44, a convergent section 45, a throat section 47 and a divergent section 49. The intake section 44 extends from the intake 25 to the convergent section 45. The convergent section 45 extends from the intake section 44 to the throat section 47. The divergent section 49 extends from the throat section 47 to the outlet 27. With this arrangement, that portion of the flow passage 43 beyond the intake section 44 is broadly configured as a convergent-divergent nozzle.

Figure 5:
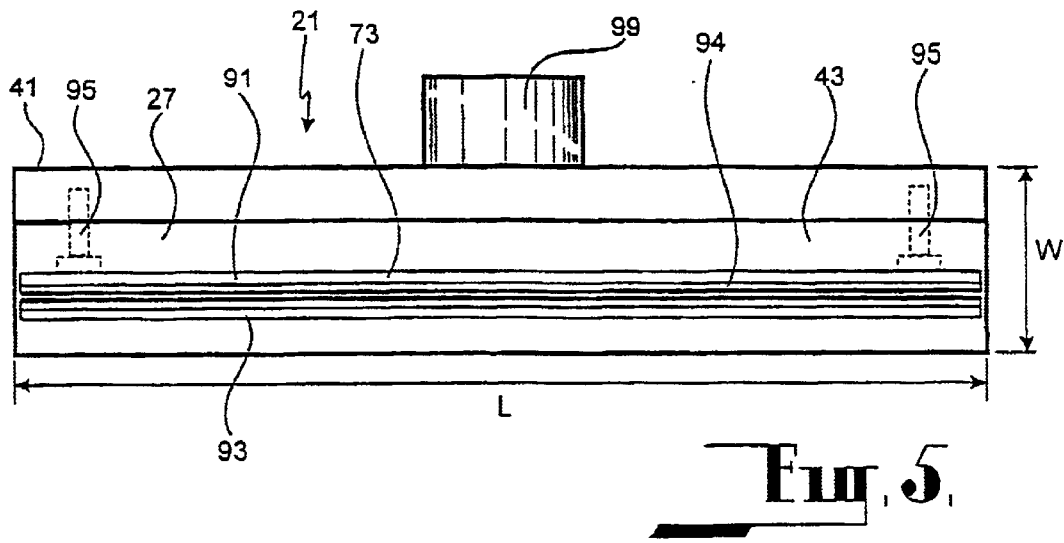
FIG. 5 is a rear elevational view of the propulsion system, showing the outlet thereof.
Figure 6:
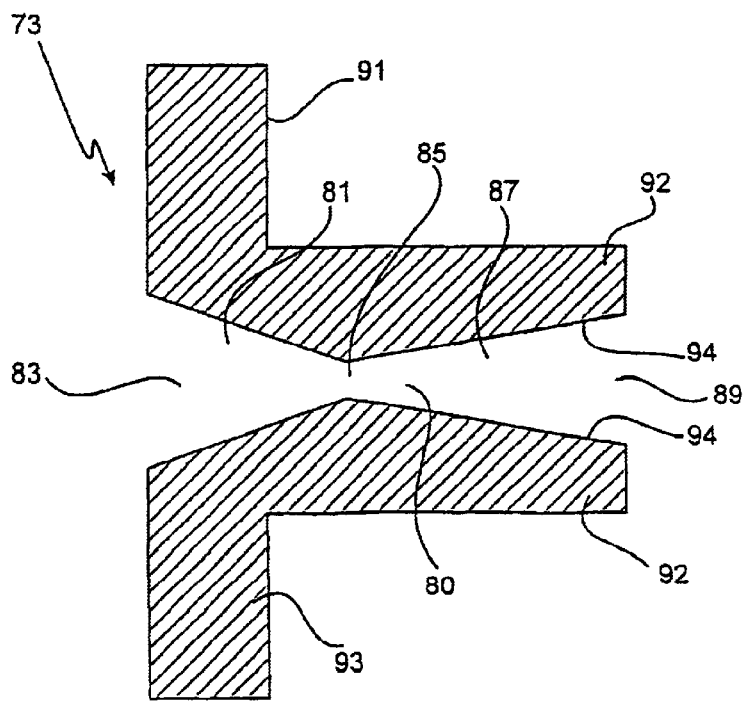
FIG. 6 is a cross-sectional view of a steam nozzle structure forming part of the propulsion system.
Figure 7:
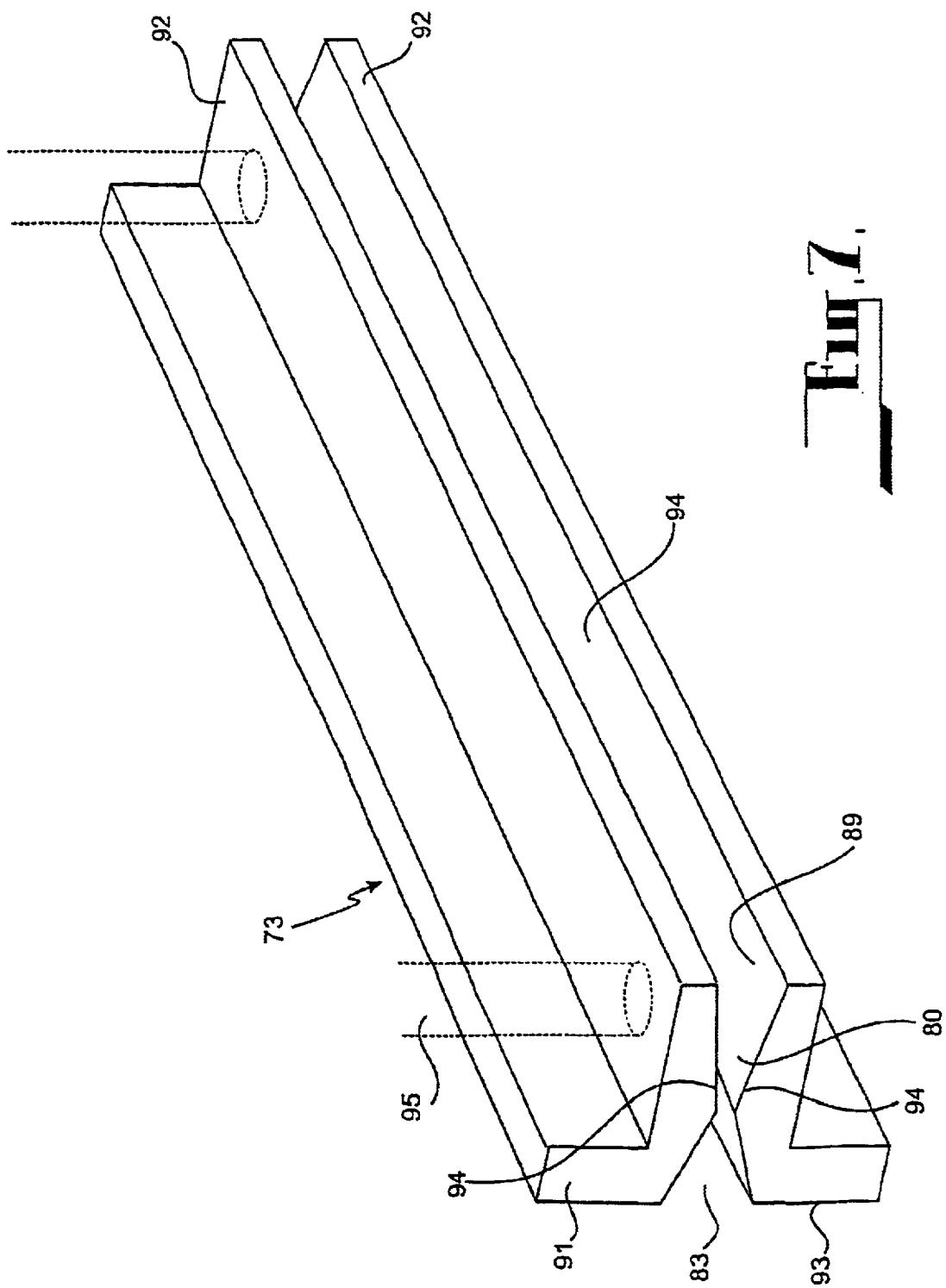
FIG. 7 is a perspective view of the steam nozzle structure.
Figure 8:
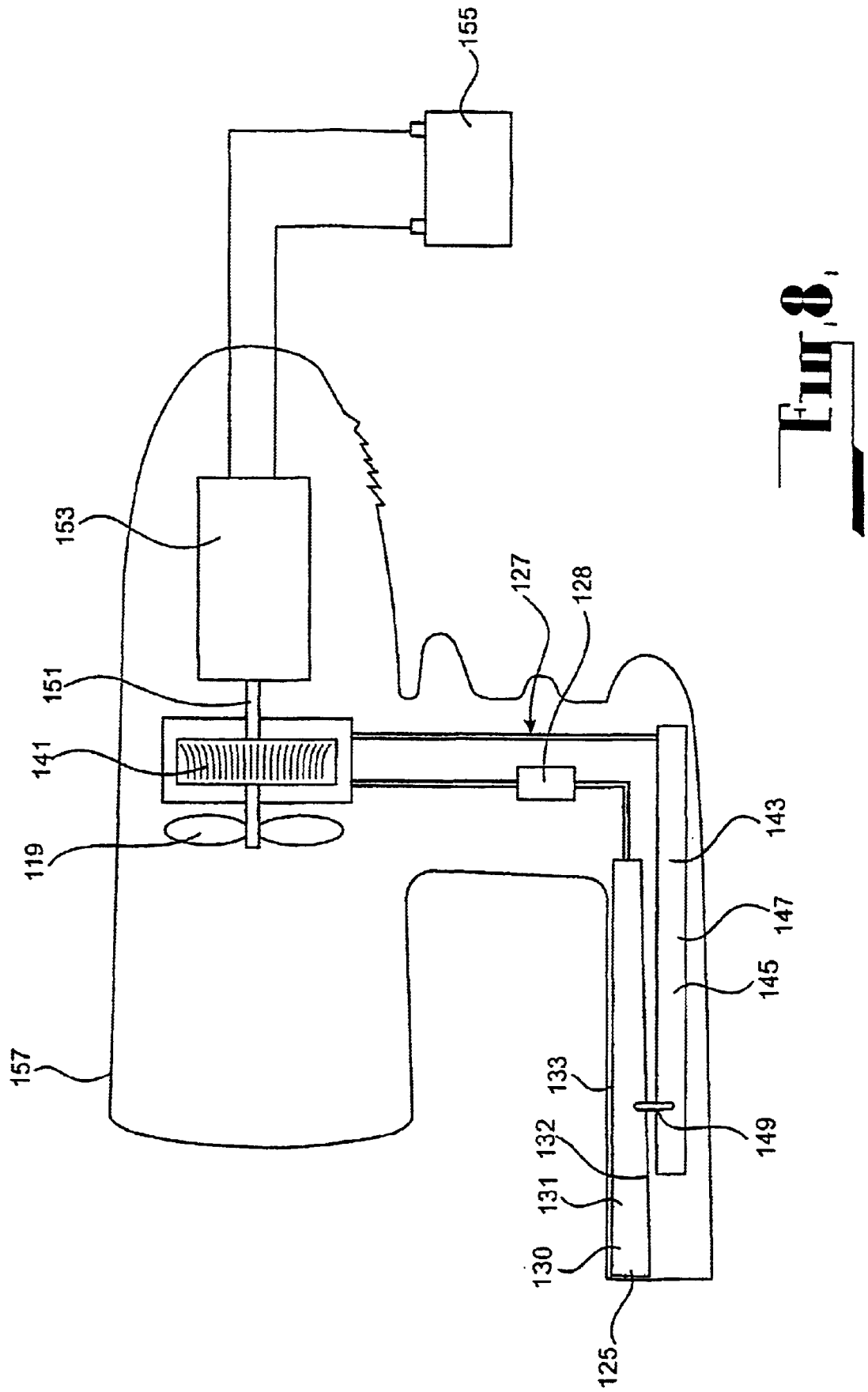
FIG. 8 is a schematic view of a refrigerant circuit included in a heat recovery system forming part of the drive unit.

In this embodiment, the flow passage 43 is of generally rectangular cross-section having a longitudinal extent L and a lateral extent W (as best seen in FIG. 5). The longitudinal extent L is significantly greater than the lateral extent W so as to ensure that the flow passage 43 is of a low profile in the transverse direction.

The intake section 44 is defined by a surrounding wall structure 50 which includes two opposed walls 51, 53, the spacing between which is selectively variable to permit adjustment of the cross-sectional area of the throat section. In this embodiment, wall 51 is an upper wall, and wall 53 is a lower wall. The surrounding wall structure 50 also includes two further opposed walls (not shown) extending between the upper and lower walls 51, 53 so as to complete a peripheral boundary around the throat section. The further side walls (not shown) are constructed to accommodate relative movement between the upper and lower walls 51, 53 upon adjustment of the cross-sectional area of the inner section. An adjustment mechanism (not shown) is provided for selectively adjusting the spacing between the upper and lower walls 51, 53 by movement of the walls towards or away from each other.

The intake section 44 incorporates an entry section 46 adjacent the intake 25. The entry section 46 is defined by a surrounding wall structure 54 which includes two opposed walls 55, 56, the spacing between which is selectively variable to permit adjustment of the cross-sectional area of the convergent section 45. In this embodiment, wall 55 is an upper wall and wall 56 is a lower wall. The surrounding wall structure 54 also includes two further opposed walls (not shown) extending between the upper and lower walls 55, 56 so as to complete a peripheral boundary around the entry section. The further side walls (not shown) are constructed to accommodate relative movement between the upper and lower walls 55, 56 upon adjustment of the cross-sectional area of the convergent section 45. An adjustment mechanism (not shown) is provided for selectively adjusting the spacing between the upper and lower walls 55, 56 by movement thereof towards or away from each other.

The convergent section 45, throat section 47 and divergent section 49 are together defined by a surrounding wall structure 60 which includes two opposed planar walls 61, 63, the spacing between which is selectively variable to permit adjustment of the cross-sectional area thereof. In this embodiment, wall 61 is an upper wall and wall 63 is a lower wall. The surrounding wall structure 60 also includes two further opposed walls (not shown) extending between the upper and lower walls 61, 63 so as to complete a peripheral boundary around the convergent, throat and divergent sections. The further side walls (not shown) are constructed to accommodate relative movement between the upper and lower 61, 63 upon adjustment of the cross-sectional area of the divergent section 49.

The lower wall 63 is mounted on a hinge 67 for pivotal movement towards and away from the upper wall 61 for varying the cross-sectional area and the profile of the convergent, throat and divergent sections 45, 47 and 49. A control means (not shown) is provided for selectively pivoting the wall 63 about hinge 67. The control means comprises a control mechanism connected to the wall 63 and operate to cause it to pivot about hinge 67. The control mechanism may for example comprise a power device such as a pneumatic or hydraulic ram.

The upper wall 61 of the convergent, throat and divergent sections 45, 47 and 49 is provided with a reversing flap 65 which is pivotally movable between a first position (as shown in FIG. 3) in which it is clear of the outlet 27 and a second position (as shown in FIG. 4) in which it extends across the outlet 27 to deflect sea water discharging through the outlet 27. The deflected sea water imparts a thrust in the opposite direction to the forward motion of the boat 13, so causing the boat to move in the reverse direction when the flap 65 is in the second position.

A driving fluid injection means 71 is provided for introducing the driving fluid, which in this embodiment is steam, into the flow passage 43.

The driving fluid injection means 71 includes a nozzle structure 73 for injecting the steam in an expanded condition into the flow passage 43 adjacent the upstream end of the divergent section 49. The nozzle structure 73 is located to one side of the throat section 47, adjacent wall 51. A transition wall 75 extends between the nozzle structure 73 and the wall 61 to provide a smooth transition between the nozzle structure 73 and the wall 61.

The nozzle structure 73 is configured as a supersonic nozzle having a nozzle passage 80 comprising a convergent section 81 commencing at an inlet end 83, a divergent section 87 terminating at an outlet end 89, and a throat section 85 interposed between the convergent and divergent sections.

The nozzle structure 73 comprises two elongate nozzle elements 91, 93 between which the nozzle passage 80 is defined. With this arrangement, the nozzle passage 80 comprises a slit 94 between the two nozzle elements 91, 93. The longitudinal extent of the slit 94 extends in the longitudinal extent L of the rectangular cross-section of flow passage 43.

Each nozzle element 91, 93 comprises a length of bar 92 having a longitudinal side 94 thereof formed with a profile corresponding to one side of the nozzle passage 80. In this way, the longitudinal sides 94 of the two bars 92 co-operate to define the flow passage 80.

The two nozzle elements 91, 93 are in a spaced apart relationship to define the nozzle passage 80 therebetween and are mounted for relative movement towards and away from each other for varying the cross-sectional area of the nozzle passage 80. More particularly, in this embodiment nozzle element 93 is fixed and nozzle element 91 is selectively movable laterally for varying the spacing with respect to nozzle element 93. A nozzle control means 95 is provided for selectively moving nozzle element 91 laterally with respect to nozzle element 93. The nozzle control means 95 may take an appropriate form, such as for example one or more power devices such as pneumatic or hydraulic rams operable to cause movement of the movable nozzle element 91 with respect to the fixed nozzle element 93. The nozzle control means 95 can be operated to move the movable nozzle element 91 during operation of the propulsion system 21, including in particular while steam is flowing through the nozzle passage 80.

The inlet end 83 of the nozzle passage 80 communicates with a steam chamber 97 which has an inlet 99 for receiving steam generated by the steam generator 31.

The steam chamber 97 has two opposed walls 101, 103 which taper inwardly towards the inlet end 83 of the nozzle passage 80. The steam chamber 97 is defined within a tubular structure 105 on which the fixed nozzle element 93 is mounted. Chamber wall 101 is defined by one of the walls of the tubular structure 105, and chamber wall 103 comprises an internal wall provided in cavity 104 within the tubular structure 105.

Aeration means 107 are provided for aerating seawater flowing along the flow passage 43 with an aeration gas or gaseous mixture, which in this embodiment comprises air.

The aeration means 107 comprises a chamber 109 communicating with the flow passage 43 via a plurality of aeration ports (not shown) upstream of the location at which steam is injected into the flow passage 43. The aeration ports are provided by perforations in wall 51 which is not only a boundary wall of the intake section 44 but also a wall of the chamber 109. With this arrangement, the air is introduced into the seawater at the intake section 44.

The air chamber 109 receives air through an air inlet 115. Air introduced during the aeration process may be by way of an open draw or it may be regulated in order to achieve the desired level of aeration. The regulation may be achieved in any suitable way, such as by restricting the air flow (for example by way of a valve) or enhancing the airflow by delivering it under pressure.

The drive system 11 utilises desalinated seawater for the boiler 31. Water for steam generation in the boiler 31 is extracted from the sea and processed in a desalinator of any appropriate type.

The boiler 31 is of the once through steam generation type and has a combustion chamber 117 in which there is provided a blower 119 for delivering combustion air into the combustion chamber 117. Combustion gases from the combustion chamber 117 pass in heat exchange relationship with water which flows through the boiler 31 and which is converted to steam from the hot combustion gases. After leaving the boiler 31, the spent combustion gases pass along an exhaust passage 121 terminating at an exhaust outlet 123 which in this embodiment is located below the water line of the boat 13 so as to discharge into the body 14 of seawater.

The exhaust gases contain remnant heat not utilised in production of steam in the boiler 31. The heat recovery system 33 is utilised to recover some of such remnant heat in the exhaust gases, as well as to recover remnant heat in the seawater flowing along the flow passage 43 after contact with the steam.

The heat recovery system 33 comprises a heat exchanger 125 in heat exchange relationship with the divergent section 49 of the flow passage 43 and also in heat exchange relationship with the exhaust passage 121. The heat exchanger 125 is in heat exchange contact with a refrigerant circuit 127. Heat extracted from the heat exchanger 125 by refrigerant in the refrigerant circuit 127 is utilised for performing further work, as will be explained later. The refrigerant circuit 127 includes a refrigerant pump 128.

The refrigerant may be of any appropriate type, such as a known refrigerant liquid or water at low pressure.

The heat exchanger 125 comprises an evaporator 130 defining an evaporator chamber 131 having a first wall 132 in heat exchange relation with the flow passage 43 and a second wall 133 in heat exchange relation with the exhaust passage 125. The first wall 132 comprises a plate 134 having one face thereof confronting the flow passage 43 and an opposed face in contact with the refrigerant. The opposed face may incorporate fins (not shown) to provide an extended surface for heat transfer. Similarly, the second wall 133 comprises a plate 137 having one face thereof confronting the exhaust passage 121 and an opposed face in contact with the refrigerant. The opposed face may incorporate fins (not shown) to provide an extended surface for heat transfer. While the plates 134, 137 can be formed of any appropriate material, they are preferably formed of cupro-nickel.

In the refrigerant circuit 127, heat is extracted from the seawater in the flow passage 43 and from the exhaust gases in the exhaust passage 121 by evaporation of the refrigerant. The resultant refrigerant vapour drives an impeller 141 such as a turbine wheel incorporated in the refrigerant circuit, converting energy in the refrigerant vapour into torque.

The refrigerant circuit also incorporates a second heat exchanger 143 positioned between the impeller wheel 141 and the evaporator 130. The second heat exchanger 143 comprises a condenser 145 having a condensing chamber 147 through which the refrigerant flows. The condenser 145 is so positioned as to be in contact with the seawater to which heat is transferred upon condensation of the refrigerant.

The refrigerant circuit 127 includes flow line 149 extending between the condenser 145 and the evaporator 130.

The impeller 141 is drivingly connected to a drive shaft 151 on which the blower 119 in the combustion chamber 117 of the boiler 31 is mounted. The drive shaft 151 is also connected to an electrodynamic machine 153 which has two modes of operation, a first mode being as a motor in which case it drives the drive shaft 151 and thus the impeller 141 and the blower 119 connected thereto, and a second mode being as an alternator in which case it is driven by the drive shaft 151. When functioning as a motor, the electrodynamic machine 153 is powered by a battery 155 which may also supply electrical power to other componentry in the drive system 11, as well as to electrical and electronic devices on the boat 13.

At commencement of the operation of the drive system 11, the electrodynamic machine 153 operates in the first mode as a motor powered by the battery 155. While operating as a motor, the electrodynamic drives the blower 119 in the boiler 31. During operation of the drive system 11, heat develops in the exhaust gases flowing along exhaust passage 121, and also in the seawater flowing along flow passage 43 as a consequence of the injection of steam into the flow passage 43. Heat is extracted at the evaporator 130 by evaporation of the refrigerant, so producing refrigerant vapour which imparts torque to the drive shaft 151 through the impeller 141. The torque imparted to the drive shaft 151 drives the blower 119 and also the electrodynamic machine 153 which then commences to operate in its second mode as an alternator which charges the battery 155.

The propulsion system 21, boiler 31, desalinator, exhaust passage 121, steam injection means 71, aeration means 107, and refrigerant circuit 127 are incorporated in a housing 157.

Operation of the drive system 11 for propelling the boat 13 will now be described. The boiler 31 is fired so as to commence production of steam. At this stage, the blower 119 in the combustion chamber 117 of the boiler is driven by the electrodynamic machine 153 operating in its first mode as an electric a motor powered by the battery 155 of the drive system. Spent combustion gases from the combustion chamber 117 of the boiler 31 pass along the exhaust passage 121 and discharge through exhaust outlet 123 into the seawater. As the boiler 31 is of the once-through steam generation type, it can provide a supply of steam rapidly. Once steam is available, the propulsion system 21 can operate. Initially, there is a substantially static volume of seawater in the flow passage 43 of the propulsion system 21. When propulsion is required, steam from the boiler 31 is introduced into the flow passage 43 by way of the injection system 71. More particularly, steam is delivered under pressure into the steam chamber 97 from where it discharges under pressure through the nozzle structure 73 into the flow passage 43. The nozzle structure 73 is at this stage at a setting commensurate with the commencement of operation of the propulsion system 21. Similarly, the variable cross-sectional areas of the intake section 44, convergent section 45, throat section 47 and divergent section 49 of the flow passage 43 are also at settings commensurate with commencement of operation of the propulsion system 21. In this embodiment, steam is supplied to the nozzle structure at a temperature of about 200° C. and a pressure of about 7 bar, although other steam conditions are possible. Indeed, it may be desirable in certain circumstances to provide the steam in a superheated condition. It is also desirable for the steam, upon exiting from the nozzle structure 73, to achieve its maximum velocity and to be fully expanded to about 1 atm.

The flow rate of the steam is set according to the desired amount of thrust to be generated. In this embodiment, mass flow rates of steam to water in a ratio of about 1:100 to 1:150 are typically utilized.

As the steam passes through the nozzle structure 73, it undergoes a reduction in pressure and an increase in velocity (typically to sonic levels), and discharges into the flow passage 43. The region of the flow passage 43 into which the steam discharges can be considered as a mixing zone because of the mixing of the incoming steam with seawater in the flow passage 43. The high velocity steam interacts with the seawater, involving a momentum transfer to the seawater causing a flow along the flow passage 43 towards the outlet 27. Additionally, the steam condenses upon exposure to the cooling influence of the seawater. It is believed that this rapid cooling action produces a rapid collapse or implosion where the steam and seawater interact. The rapid collapse or implosion of the steam provides a rapid pressure reduction at the mixing zone, drawing further seawater through the intake 25 and along the flow passage 43 to the outlet 27. The high velocity of the steam molecules effects momentum transfer to the sea water flow and accelerates the sea water flow at an increased velocity, so assisting in the draw of sea water through the intake 25 and into the flow passage 43 on a continuous basis. Forward movement of the boat 13 also assists the flow of seawater through the intake 25 and along the flow passage 43.

The aeration means 107 prior to contact with the steam aerates the seawater flowing through the flow passage 43. Aeration of the seawater produces a two-phase mixture which has some compressibility. It is believed that the aeration has the effect of lowering the density of the two-phase mixture in comparison to the sea water, so assisting in the transfer of the sea water along the flow passage 43 towards the mixing zone. The aeration process also reduces skin friction between the seawater and the boundary surfaces of the flow passage 43.

In this embodiment, the ratio of air to water in the aeration process is about 1:300 by volume.

It is believed that contact between the steam and seawater at the mixing zone within the flow passage 43 may also cause liberation of gases (and oxygen in particular) from the water. The presence of such liberated gases may assist in a reduction of frictional losses in the moving flow of seawater.

The divergent section 49 of the flow passage 43 has the effect of controlling the velocity and pressure of the aerated seawater, so enhancing the thrust generated.

The thrust generated by the propulsion system 21 can be regulated. Broadly, for a low boat speed there is a requirement for a larger volume of slower moving seawater to flow along the flow passage 43, and for a high boat speed there is a requirement for smaller volume of faster moving seawater to flow along the flow passage 43. The volume of seawater and the flow rate of the seawater can be regulated by adjustment of the various settings available within the propulsion system 21. More particularly, the volume of sea water flowing through the flow passage 43, can be regulated by adjustment of the cross-sectional areas of the intake section 44, convergent section 45, throat section 47 and divergent section 49 of the flow passage 43 as previously described. The flow rate of seawater can be regulated by the quantity and velocity at which steam is injected into the flow passage 43 by the steam injection system 71. Additionally, the profile of the convergent, throat and divergent sections 45, 47 and 49 of the flow passage 43 is selectively variable by pivotal movement of the lower wall 63 about hinge 67. The delivery of steam can be regulated by way of the nozzle structure 73, with the size of the nozzle passage 80 between the nozzle elements 91, 93 being adjusted as necessary in order to achieve desired steam delivery. The propulsion system 21 has the facility for alteration to the various settings which control the flow rate of the sea water along the flow passage 43 from the inlet 25 to the outlet 27 at any time as is desired during operation of the drive system. Similarly, the rate of delivery of steam to the flow chamber and the extent of aeration of the seawater can be regulated as required.

The exhaust gases flowing along exhaust passage 121 contain remnant heat not utilised in production of steam in the boiler 31. Additionally, seawater flowing along the flow passage 43 downstream of the mixing zone contains remnant heat as a result of contact with the injected steam. The heat recovery system 33 is utilised to recover some of the heat. Specifically, the evaporator 130 is exposed to the exhaust gases in exhaust passage 121 via plate 137 and so extracts some of the heat in the exhaust gases. Similarly, the evaporator 130 is exposed to the seawater via plate 134 and so extracts some of the remnant heat in the seawater. The refrigerant in the refrigerant circuit 127 extracts the heat by evaporation. The resultant refrigerant vapour is circulated by pump 128 and contacts the impeller 141, causing rotation thereof. Rotation of the impeller 141 applies torque to the drive shaft 151, so driving the blower 119 in the combustion chamber 117 of the boiler 31. Once the refrigerant vapour imparts sufficient torque to the drive shaft 151 through the impeller 141, drive from the electrodynamic machine 153 operating in its first mode as an electric motor is no longer necessary. The electrodynamic machine 153 can then convert to operation in its second mode in which it functions as an alternator driven by the drive shaft 151. In its capacity as an alternator, the electrodynamic machine 153 charges the battery 155 from which it was previously supplied with electric power when functioning as a motor.

From the foregoing, it is evident that the drive system 11 according to the embodiment operates as a somewhat self-contained unit, apart for the need to deliver fuel for the boiler 31.

The embodiment described and illustrated is in relation to a drive system 11 operating as an outboard stern drive for a boat. Other arrangements are, of course, possible. The drive system according to the invention can be installed as an on-board unit on a boat.

The propulsion system forming part of the drive system 11 can be so positioned to provide stern drive, bow drive, or indeed it can be positioned at any location between the bow and the stern of the boat.

Furthermore, the propulsion system can be so arranged that the outlet 27 discharges into a region below the hull of the boat, resulting in aeration of water adjacent the hull. This may reduce the frictional drag effect on the watercraft.

Still further, two or more propulsion systems may be provided on the watercraft on the opposed sides of the central fore-and-aft axis thereof such that the propulsion systems can be utilised to provide steering control as well as thrust to the boat.

A particular feature of the propulsion system which has been described and illustrated is the low profile that is achieved by the rectangular configuration of the flow passage 43 at outlet 27. Because of the low profile, the propulsion system 21 can conveniently be positioned below, or incorporated into, the hull of a boat or other watercraft without creating unacceptable levels of drag.

While the embodiment has been described in relation to a watercraft in the form of a boat operational at sea, it is to be understood that the drive system may be applicable to other types of watercraft and that it may operate in or on bodies of water other than the sea, such as in or on lakes and rivers.

Figure 9:
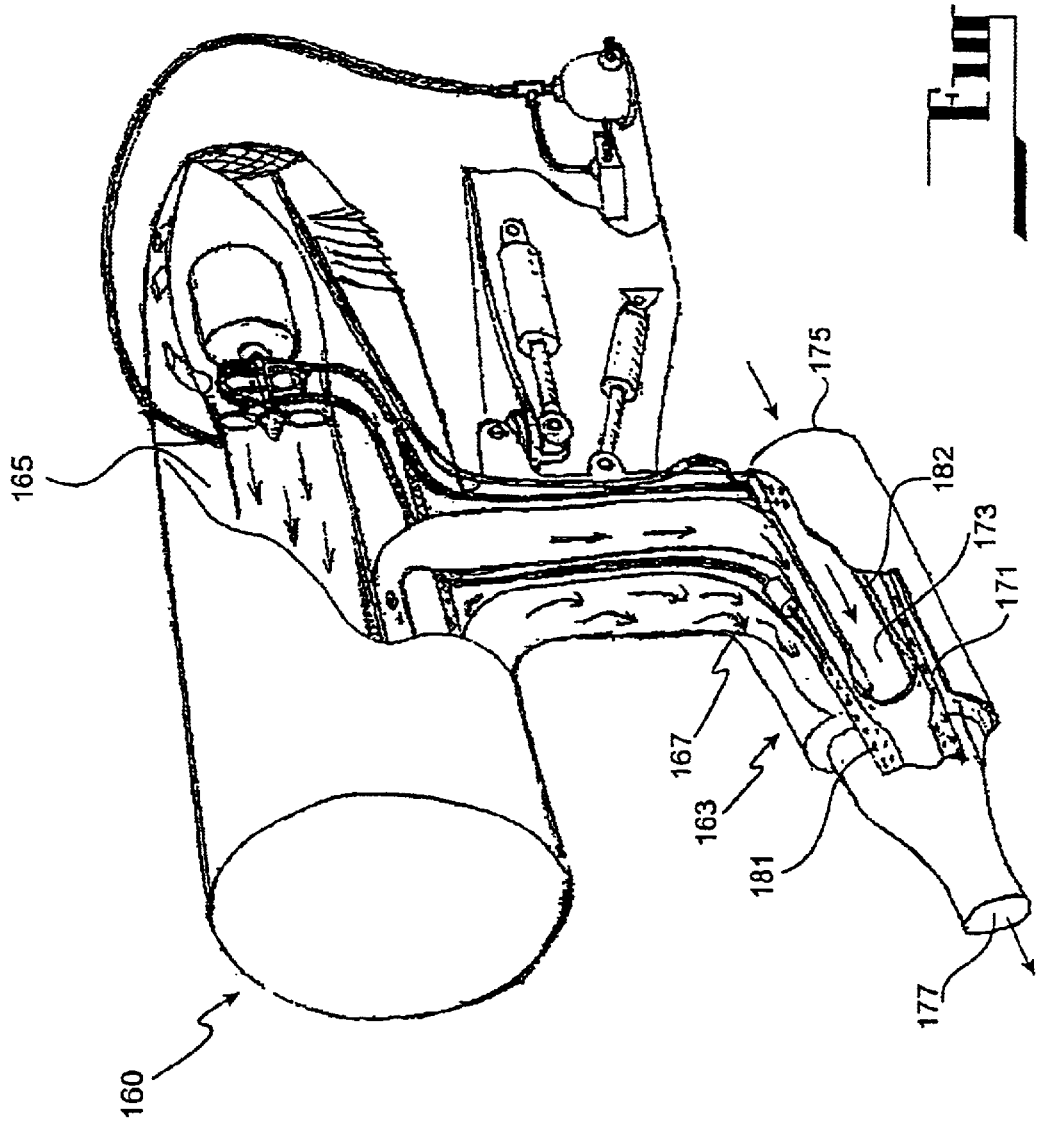
FIG. 9 is a partly cut-away schematic view of a drive system according to a second embodiment.
Figure 10:
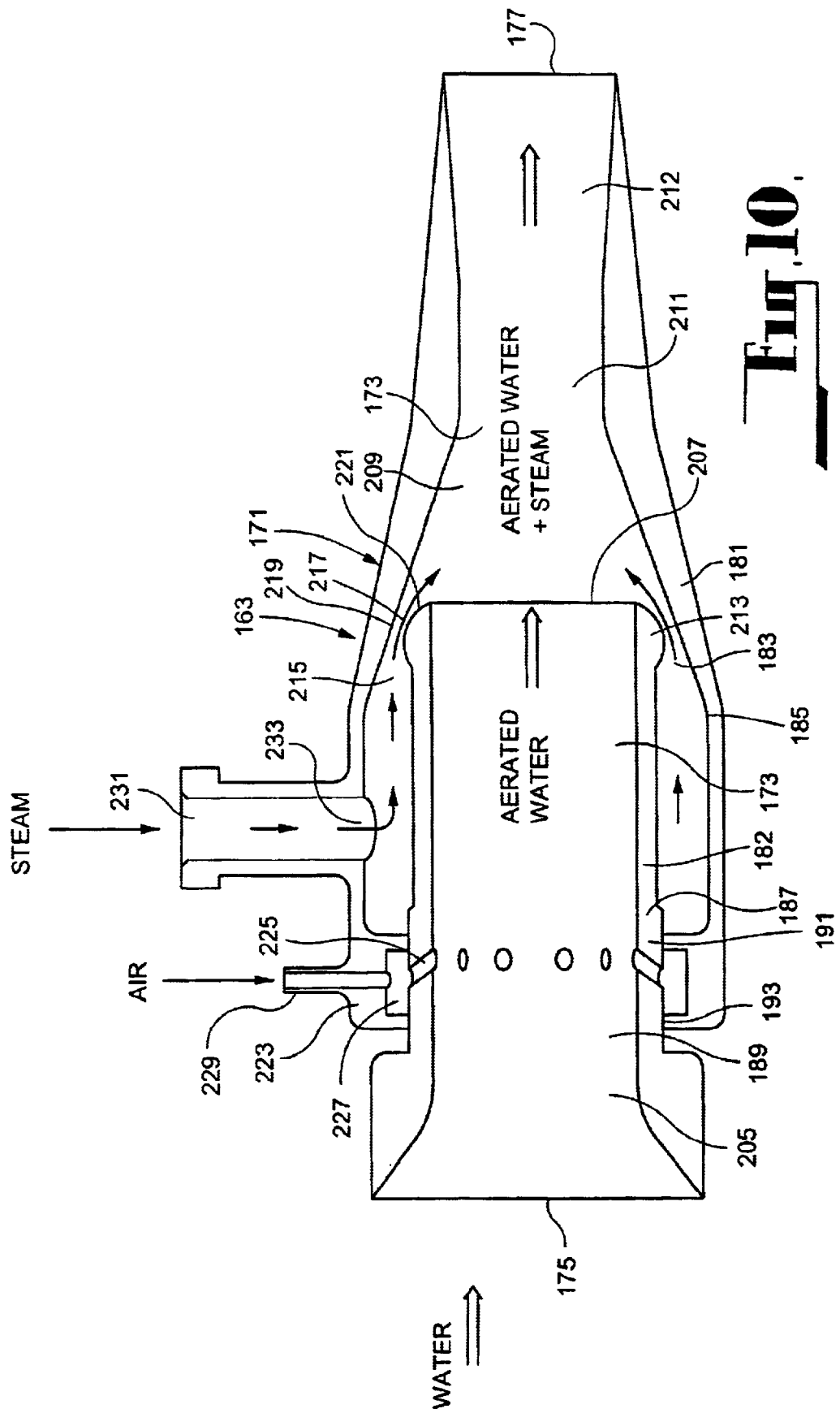
FIG. 10 is a sectional side view of a propulsion system forming part of the drive system of the second embodiment.

Referring now to FIGS. 9 and 10 of the drawings, there is shown a second embodiment directed to a drive system 160 which is similar to the drive system 11 according to the first embodiment in the sense that it incorporates a propulsion system 163, a steam generator 165 and a heat recovery system 167. The steam generator 165 and the heat recovery system 167 operate in a similar fashion to their counterparts in the drive system 11 according to the first embodiment.

In the second embodiment, the propulsion system 163 comprises a body structure 171 defining a flow passage 173 having an intake end 175 and an outlet end 177. As was the case in the first embodiment, the propulsion system 163 is so positioned that the intake end 175 is submerged in the body of water on which the watercraft is supported. During operation of the propulsion system 163, water is drawn into the intake end 175 and along the passage 173 to be discharged as a jet through the outlet 177 to provide thrust for propelling the watercraft.

The body structure 171 includes a first portion 181 and a second portion 182 disposed inwardly of the first portion 181. The first portion 181 is of a generally tubular construction and includes a central cavity 183 which is open at the ends thereof and which is surrounded by an internal wall 185. The second portion 182 is of a generally tubular construction comprising a sidewall 187 defining a central cavity 189 open at the ends thereof. The sidewall 187 incorporates a boss section 191 in threaded engagement at 193 with the first portion 181. The second portion 182 is supported within the first portion 181 by virtue of the threaded engagement at 193.

The second portion 182 extends beyond one end of the first portion 181 and is provided with means such as a sprocket (not shown) by which it can be selectively rotated within the first portion 181. Because of the threaded engagement at 193 between the first and second portions 181, 182, rotation of the second portion 182 relative to the first portion 181 causes axial displacement of the second portion 182 with respect to the first portion 181, the purpose of which will be explained later.

The first and second portions 181 and 182 co-operate to define the flow passage 173 as well as the intake end 175 and the outlet end 177.

The cavity 189 within the second portion 182 defines an intake chamber 205 which extends from the intake 175 and terminates at a discharge opening 207 defined by the opposite end of the second portion 182. The discharge opening 207 opens onto a mixing chamber 209 defined within the first portion 181. The cross-sectional area of the discharge opening 207 is smaller than the cross-sectional area of the mixing chamber 209 at the location which the discharge opening 207 opens onto the mixing chamber 209. From the mixing chamber 209, the internal wall 185 of the first portion 181 is configured to define a throat 211 followed by a diffuser section 212.

The end section 213 of the second portion 182 adjacent the discharge opening 207 is spaced inwardly of the first portion 181 to define an annular chamber 215 which opens onto the mixing chamber 209 by way of a nozzle means 217. The nozzle means 217 comprises a convergent-divergent nozzle formation defined between an inner face 219 on the internal wall 185 of the first portion 181 and an outer face 221 on the second portion 182.

An aeration means 223 is provided for aerating a stream of water drawn into the intake 175 prior to entry of that water into the mixing chamber 209. The water is aerated by introducing an aeration gas into the intake chamber 205. In this embodiment, the aeration gas is air. Air enters the intake chamber 205 through a plurality of aeration ports 225 opening into the intake chamber. The aeration ports 225 communicate with an air cavity 227 which is defined within the body structure 171 and which receives air through air inlet 229. In this embodiment, the air inlet 229 is coupled to a source of air by way of an air hose (not shown).

An inlet 231 is provided for introducing a hot compressible driving fluid into the annular chamber 215 via an opening 233 in the first portion 181. In this embodiment, the driving fluid is in the form of steam under pressure. From the annular chamber 215, the steam passes through the nozzle means 217 and enters the mixing chamber 209, the flow direction of the steam being generally in the direction towards the outlet 177. As the steam travels through the nozzle means 217 it undergoes a reduction in pressure and an increase in velocity (typically to supersonic levels) as it discharges into the mixing chamber 209. The high velocity steam follows the boundary wall 210 of the mixing chamber 209 by virtue of the phenomenon known as the Coanda effect and in doing so surrounds water drawn into the mixing chamber 209 from the intake 175. It is believed that the steam surrounds the water stream within the mixing chamber 209 and condenses upon exposure to the cooling influence of the water so causing a rapid collapse or implosion. The rapid collapse or implosion of the steam provides a rapid volume reduction and hence draws further water through the intake 175 and along the flow passage.

The high velocity of the steam molecules also effect momentum transfer to the water stream and accelerate the water stream at an increased velocity. Consequently, water is entrained from the intake 175 to the mixing chamber 209 on a continuous basis.

It is believed that contact between the steam and the water in the mixing chamber 209 may also cause liberation of gases (and oxygen in particular) from the water. The presence of such liberated gases is beneficial, as described previously in relation to the first embodiment.

The mixing chamber 209 has a greater cross-sectional area than the cross-sectional area of the discharge opening 207 at the location where the discharge opening opens onto the mixing chamber, and consequently accommodates expansion of the aerated water entering the mixing chamber through the discharge opening and providing a zone in which the high velocity steam can work to impart momentum upon the aerated water.

In the mixing zone 209, the water continues to accelerate with momentum towards the throat 211 owing to the contracting configuration of the mixing chamber 209. The water increase in pressure as it passes through the diffuser section 212 and is assisted by the expanding bubbles arising from the aeration process as the bubbles exert pressure on the surrounding water molecules.

Thrust generated by the propulsion system 160 can be regulated by controlling the rate and pressure at which steam is delivered to the mixing chamber 209. Further regulation may possibly be achieved by regulating the extent of aeration of the water stream delivered to the mixing chamber 209. Still further regulation may possibly be achieved by varying the characteristics of the nozzle means 217 through which steam is delivered into the mixing chamber 209. This may be accomplished by axial displacement of the second portion 182 with respect to the first portion 181 by rotation of the second portion as previously described. Such displacement alters the cross-sectional size of the nozzle means 217.

A valve means (not shown) is incorporated in the inlet 231 for selectively diverting steam delivered to the inlet and causing it to flow in the reverse direction to normal fluid flow along the intake chamber 205 to discharge outwardly through the intake 175. In this way, the propulsion system may be utilised to provide reverse thrust to the watercraft 13.

Steam conditions and steam and water mass flow rates are similar to those described in relation to the first embodiment.

Figure 11:
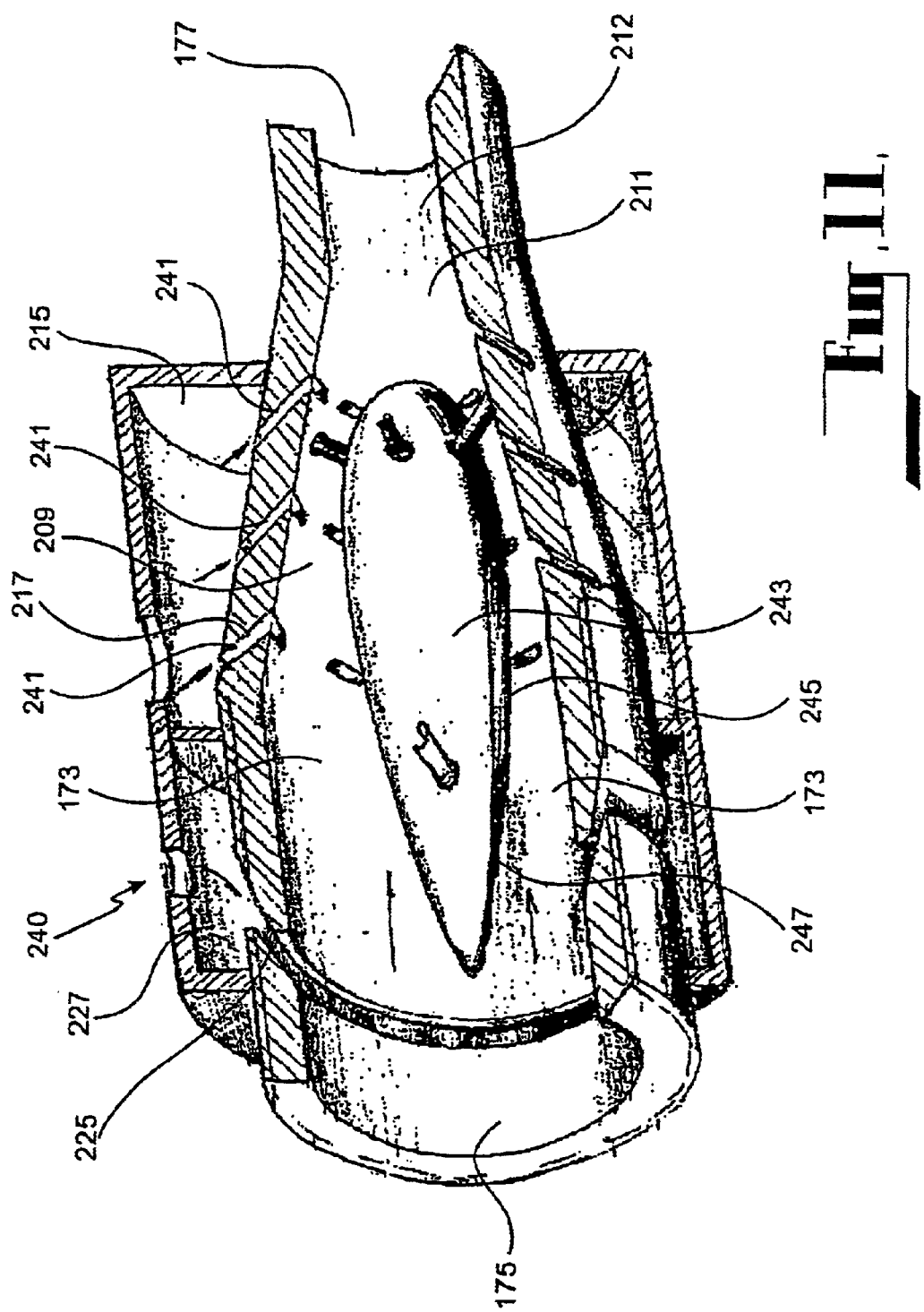
FIG. 11 is a partly sectional schematic view of a propulsion system forming part of a drive system according to a third embodiment.

Referring now to FIG. 11 of the drawings, there is shown a propulsion system 240 according to a third embodiment. The third embodiment is somewhat similar to the second embodiment, with the exception that the nozzle means 217 comprises a series of nozzles 241 spaced at intervals along the mixing chamber 209 in the direction of flow along the passage 173. Furthermore, a flow control device 243 is centrally located in the mixing chamber 209. The device 133 has an outer face 245 which defines an inner boundary surface 247 for directing incoming water into close proximity to the outer peripheral boundary of the mixing chamber 209 for improved contact with the steam.

Figure 12:
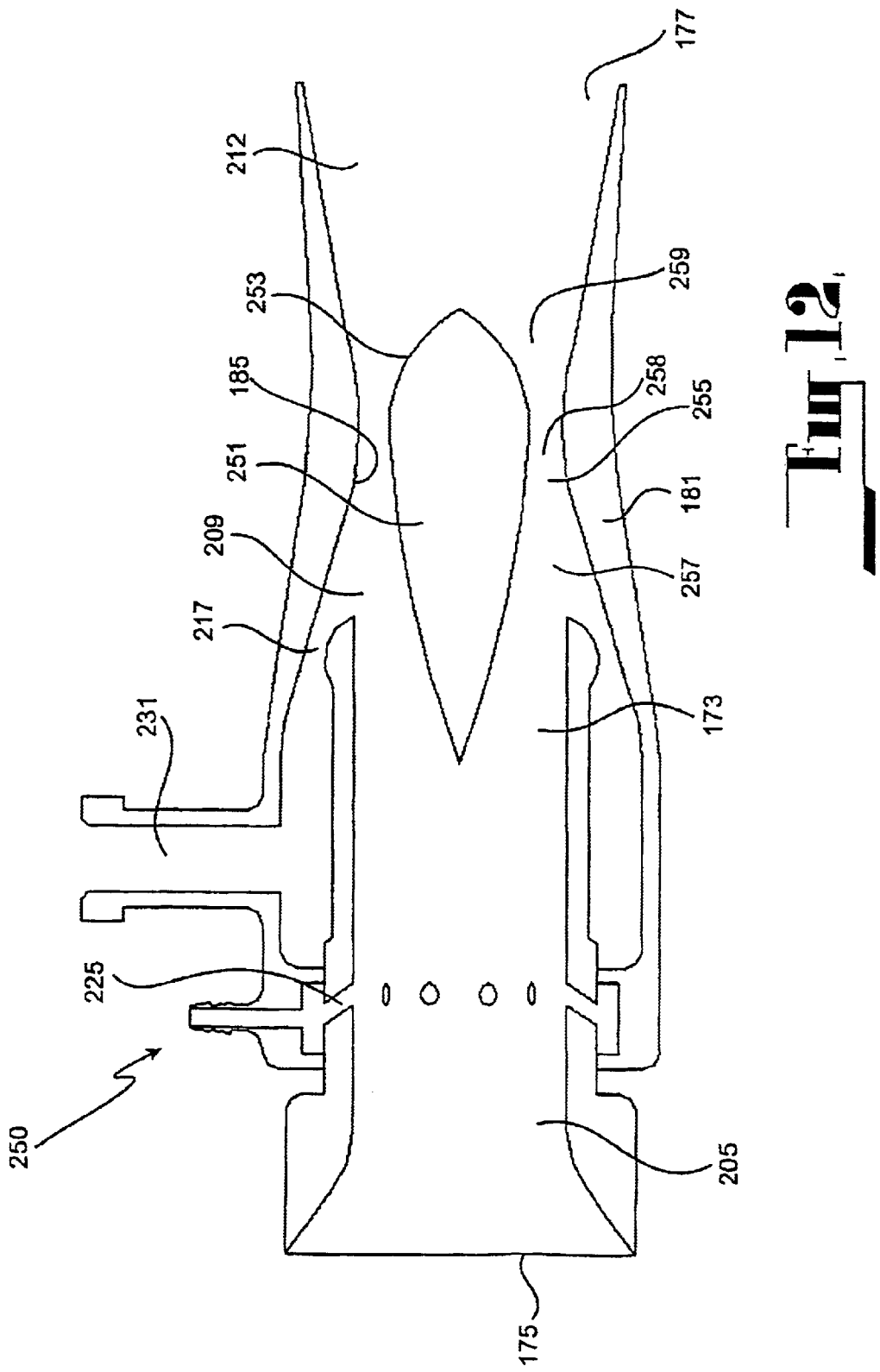
FIG. 12 is a schematic sectional view of a propulsion system forming part of a drive system according to a fourth embodiment.

FIG. 12 shows a propulsion system 250 for a drive system according to a fourth embodiment. The propulsion system 250 is similar to the propulsion system 163 of the second embodiment, and additionally includes a flow control device 251 located in the flow control passage 173. The flow control device has an outer face 253 which co-operates with the internal wall 185 of the first portion 181 of the propulsion system 250 to define an annular zone 255 having a convergent region 257, a throat region 258 and a divergent region 259. The convergent region 257 provides the mixing zone into which steam is injected through the annular nozzle defined by the nozzle means 217. The divergent region 259 opens onto, and forms part of, the diffuser section 212.

Figure 13:
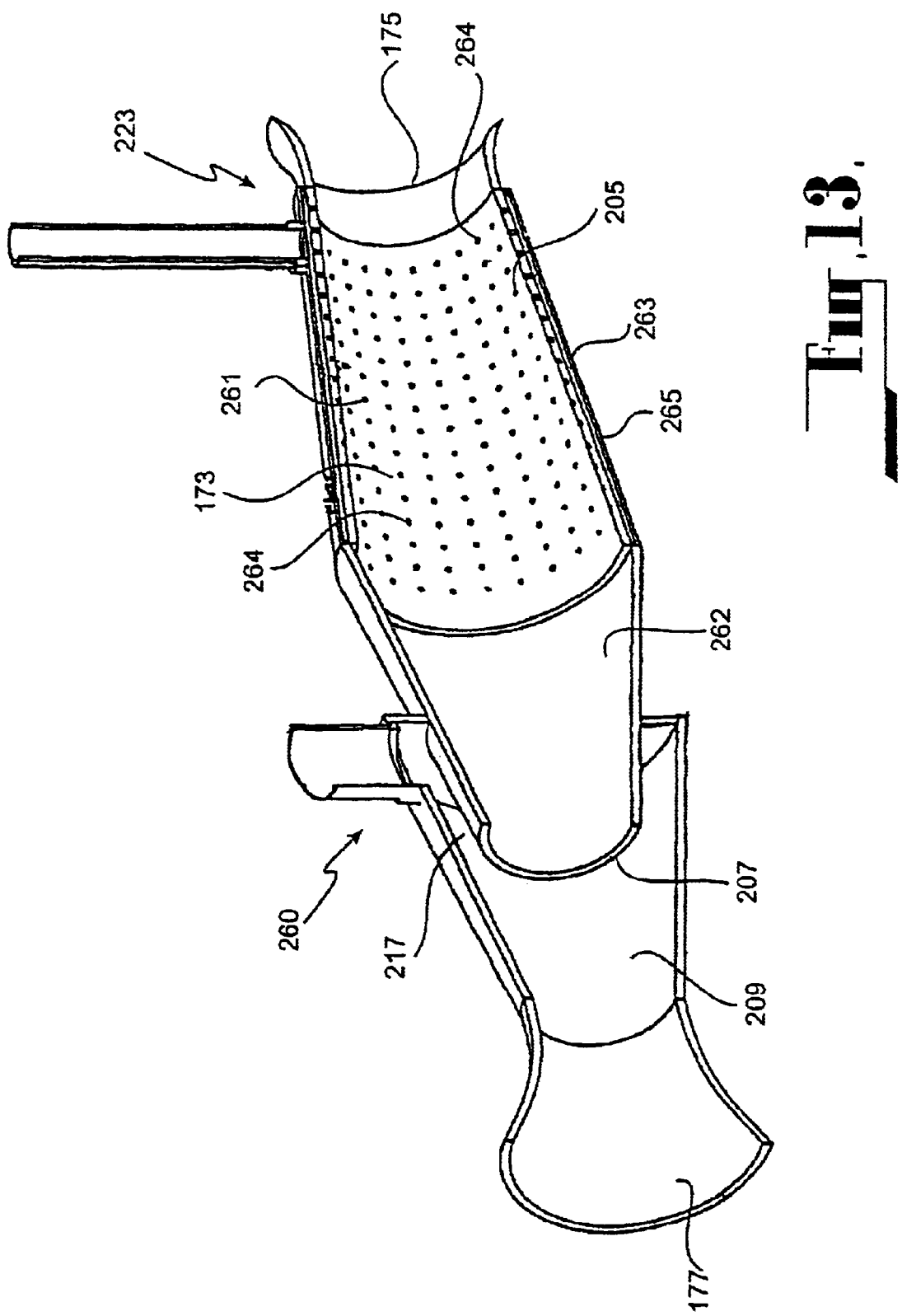
FIG. 13 is a schematic side view of a propulsion system forming part of a drive system according to according to a fifth embodiment.

FIG. 13 illustrates a propulsion system 260 for a drive system according to a fifth embodiment. The propulsion system 260 is similar to the propulsion system 163 of the second embodiment in the sense that it comprises a body structure 171 having first and second portions 181, 182 to define a flow passage 173 extending between an intake 175 and an outlet 177. The intake 175 is flared at the entry section to smoothly guide water into the flow passage 173. The flow passage 173 has an intake chamber 205 which incorporates a divergent section 261 extending from the flared entry section followed by a convergent section 262 opening onto the mixing chamber 207. The aeration means 223 comprises an annular air chamber 263 positioned as a sleeve about the diverging section 261. A plurality of aeration ports 264 are provided along and circumferentially around the divergent section 261 for introducing an aeration gas such as air into the flow passage 173.

In the embodiments which has been described, the driving fluid has been steam. In other embodiments, the driving fluid may be a multi-phase fluid such as, for example, a mixture of steam, air and water droplets. The air and water droplets may be entrained into the steam as a mist. Such a multi-phase driving fluid has a higher mass flow rate than simply steam and may provide advantages.

Figure 14:
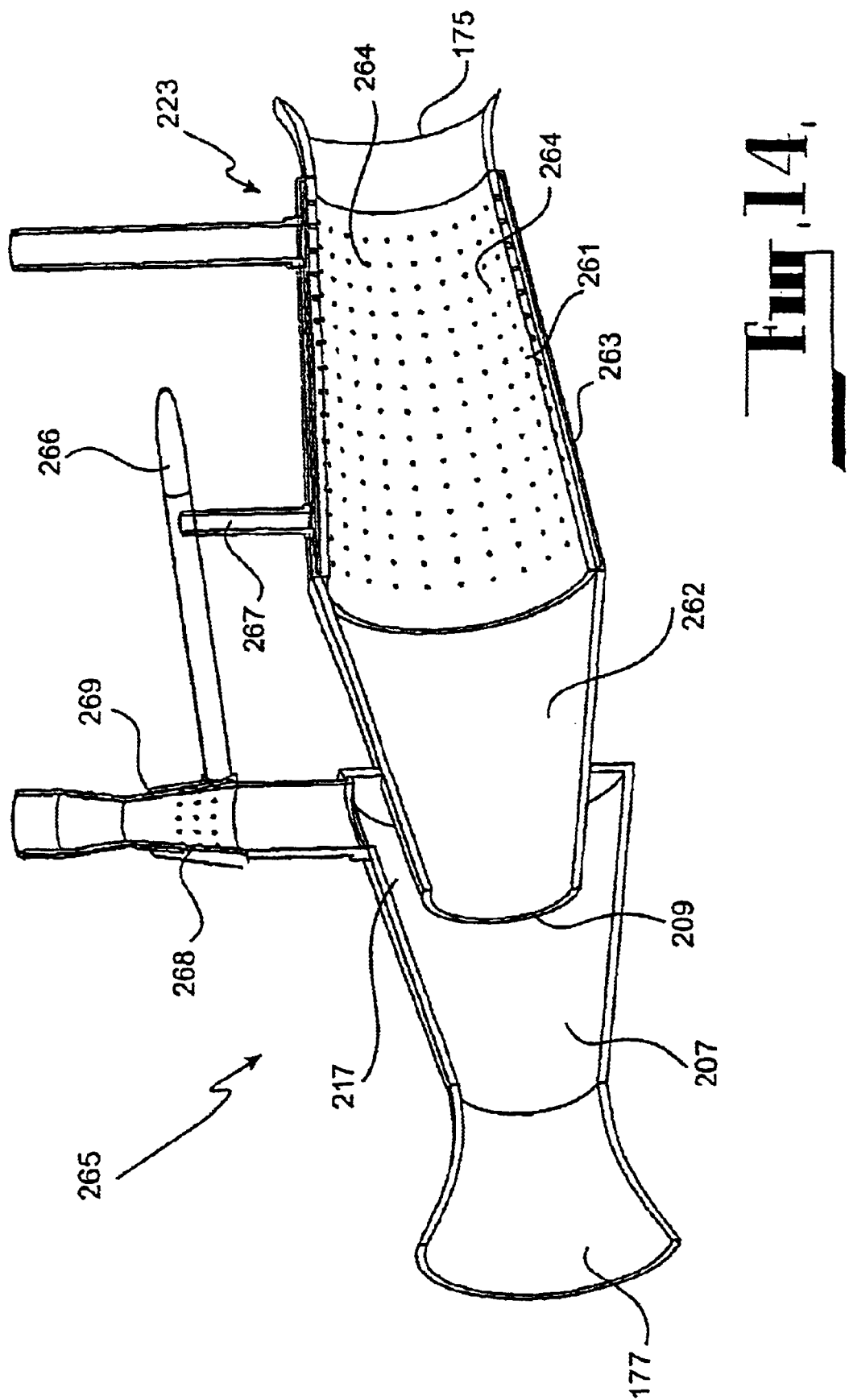
FIG. 14 is a schematic side view of a propulsion system forming part of a drive system according to according to a sixth embodiment.

One such embodiment is shown in FIG. 14 of the drawings. In this embodiment, the propulsion system 265 is similar to the propulsion system 260 according to the previous embodiment with the exception that the driving fluid is a mixture of steam, air and water droplets. The air and water droplets are introduced into the steam as a mist created using water delivered via a water line 266 and air entrained in the water from the air chamber 263 via air line 267. The mist is introduced into the steam flow at a nozzle structure 268 which includes a diverging section 269. The steam transfers momentum and heat to the mist, increasing the mass of the mixture. The introduction of the mist, together with the diverging section 269, provides control over the velocity of the multi-phase flow. The introduction on the air into the water flow aids in the transfer of momentum and heat from the steam flow. The purpose of increasing the mass flow rate and influencing the velocity before exit from nozzle 268 is to allow maximum momentum and heat transfer between the steam and the water and air flow mixture.

Figure 15:
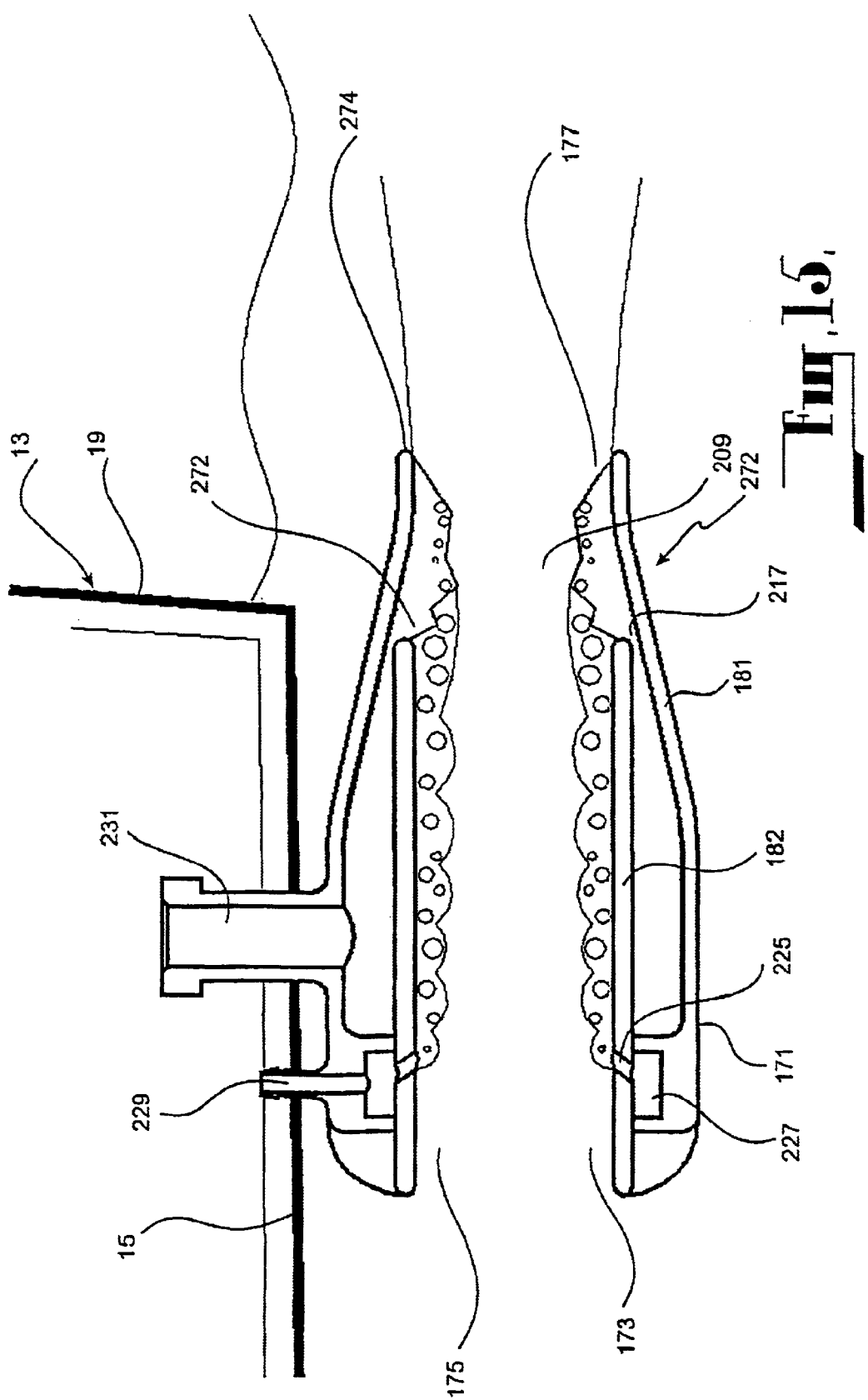
FIG. 15 is a schematic side view of a propulsion system forming part of a drive system according to according to a seventh embodiment.

Referring now to FIG. 15 of the drawings there is shown a propulsion system 272 for a drive system according to a still further embodiment. The propulsion system 272 is similar to the propulsion system 163 according to the second embodiment in the sense that it comprises a body structure 171 defining a flow passage 173 having an intake end 175 and an outlet end 177, with the body structure comprising a first portion 181 and a second portion 182. In this, embodiment, however, the first and second portions 181, 182 are so configured that the intake end 175 and the outlet end 177' are of substantially the same size in terms of the cross-sectional flow area thereof. Additionally, the flow passage 173 is of substantially uniform cross-sectional size throughout its length, apart from some minor variation at the location where the nozzle means 217 opens onto the flow passage 173, and of substantially the same cross-sectional flow area as the intake end 175 and outlet end 177. An annular implosion zone is established within the mixing chamber 207 in the region where the two-phase mixture 274 of water and air contacts the injected steam.

The feature of the intake end 175 and outlet end 177 being of substantially the same cross-sectional flow area, with the flow passage 173 being of substantially the same cross-sectional flow area, results in there being no physical restriction to water flow between the intake end 175 and outlet end 177. Such an arrangement may be advantageous in certain applications.

A particular advantage of the propulsion system 272 according to this embodiment is that the body structure 171 presents a relatively small frontal area to the body of water through which it advances when in operation, so as to reduce the effect of drag.

Figure 16:
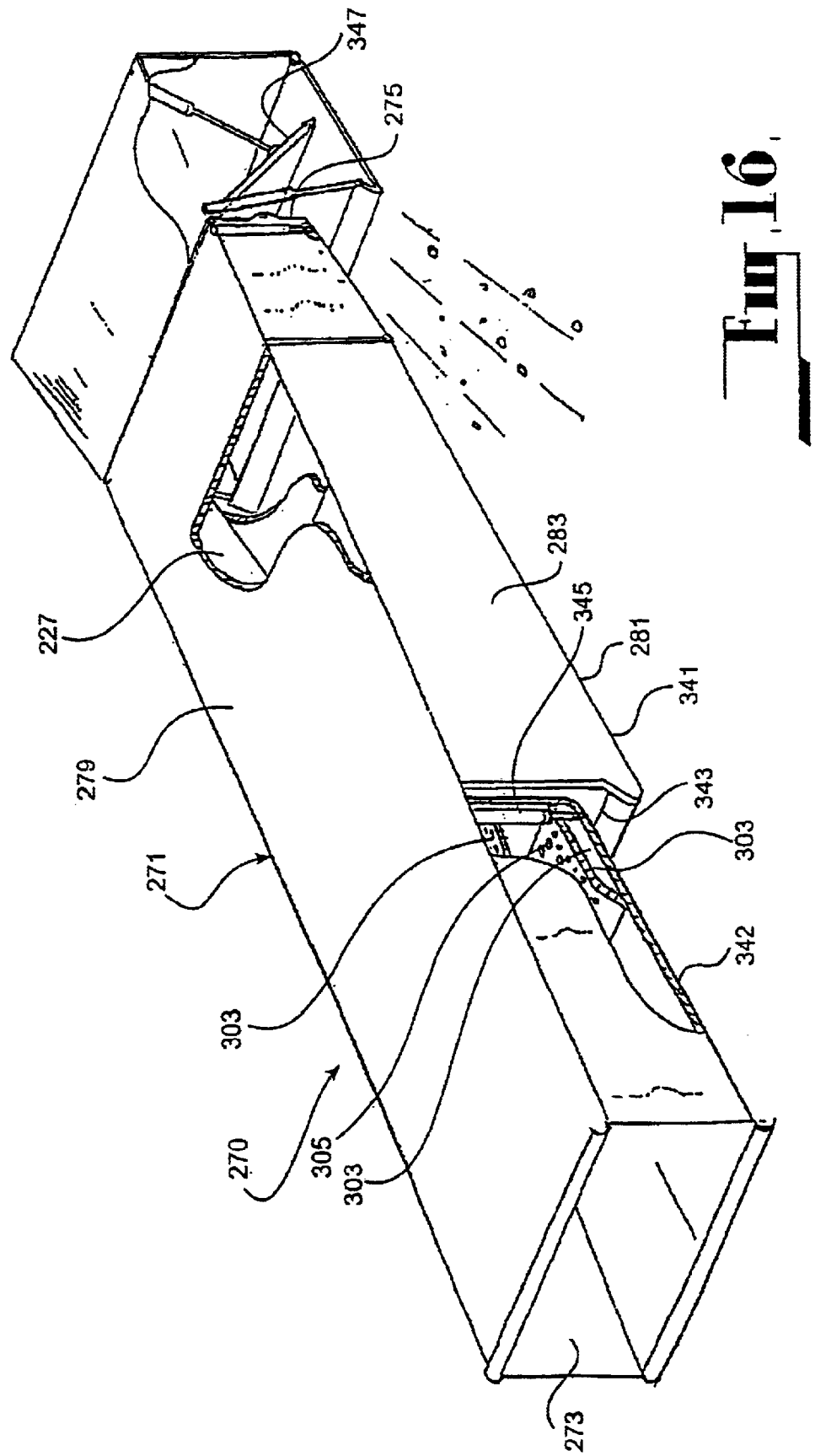
FIG. 16 is a perspective view of a propulsion system for a drive system according to an eighth embodiment, with various parts of the propulsion system being cut-away.
Figure 17:
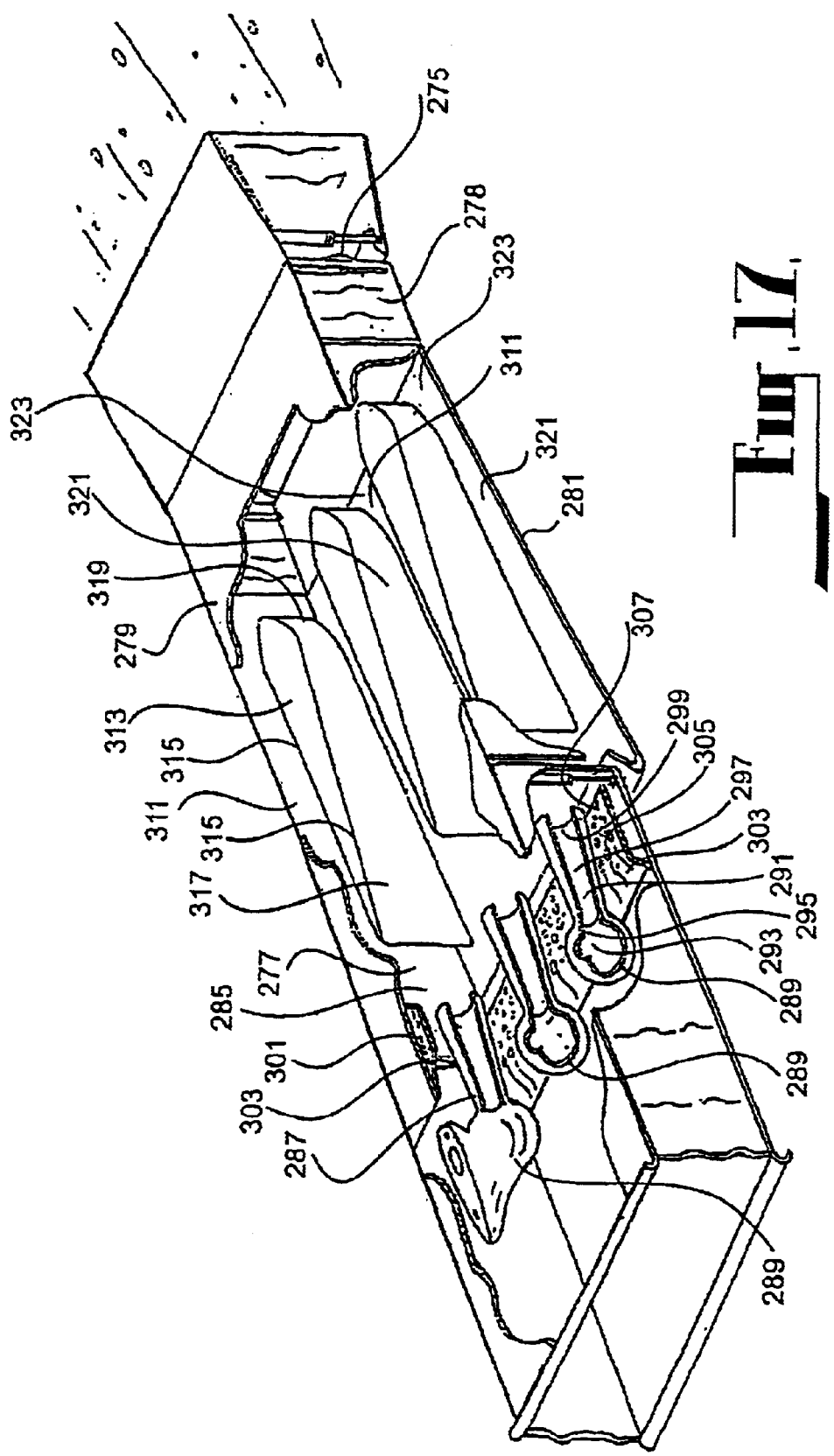
FIG. 17 is a view similar to FIG. 16, except that other parts of the propulsion system are cut-away.

Referring now to FIGS. 16 and 17 of the drawings, there is shown a propulsion system 270 for a drive system according to a still further embodiment for a watercraft such as a boat and in particular a larger boat or marine vessel.

The propulsion system 270 comprises a housing 271 defining an intake 273 and an outlet 275, with a flow passage 277 extending between the intake 273 and the outlet 275. The housing 271 is generally rectangular in cross-section, having top and bottom walls 279 and 281 respectively, and sidewalls 283. A mixing zone 285 is defined within the flow passage 277.

A driving fluid injection system 287 is provided for introducing a driving fluid in the form of steam into the flow passage 277.

The driving fluid injection system 287 comprises a plurality of steam injection nozzles 289 at spaced intervals across the flow passage 277, as shown in FIG. 13 of the drawings. The nozzles 289 are arranged to inject steam into the mixing zone 285 in a flow direction towards the outlet 275. Each nozzle 289 is configured as a supersonic nozzle having a nozzle passage 291 comprising a convergent section 293, a throat section 295, and a divergent section 297 terminating at an outlet 299 opening onto the mixing zone 285.

Aeration means 301 are provided for aerating seawater flowing along the flow passage 277 from the intake 273 to the outlet 275, with an aeration gas or gaseous mixture which in this embodiment comprises air. The aeration means 301 comprises two aeration chambers 303 disposed onto opposed sides of the flow passage 277. Specifically, the aeration chambers 303 comprise a lower aeration chamber located adjacent the lower wall 281 and an upper aeration chamber located adjacent the upper wall 279, as shown in the drawings. Each aeration chamber 303 includes a boundary wall 305 which is exposed to the flow passage 277 and which includes a plurality of aeration ports 307.

The aeration chambers 303 communicate with a supply of aeration gas which in this embodiment is air. With this arrangement, air is drawn into the flow passage 277 in response to flow of seawater along the flow passage from the intake 273 to the outlet 275. It should, however, be appreciated that, in an alternative, arrangement air may be supplied under pressure to the aeration chambers 303.

Each aeration chamber 303 is located upstream of the mixing zone 285 with respect to the direction of flow along the flow passage 277 such that sea water flowing along the flow passage 277 is aerated prior to contact with steam injected through the steam injection system 287.

The flow passage 277 includes an outlet section 278 adjacent to and terminating at the outlet 275.

Between the mixing zones 285 and the outlet section 278, the flow passage 277 is divided into a series of separate flow paths 311 by flow control elements 313 located within the housing 271. The flow control elements 313 are located at spaced intervals across the flow passage 277, as shown in FIG. 17 of the drawings. Each flow control element 313 has opposed longitudinal sides 315 which include a diverging side section 317 and a converging side section 319. With this arrangement, the flow control elements 313 co-operate to configure each flow path 311 so as to comprise a convergent section 321 and a divergent section 323. The length of the convergent section 321 is considerably greater than the length of the divergent section 323, as seen in FIG. 17. It will also be noted that the two outer flow paths 311 immediately adjacent the sidewalls 283 also comprise convergent and divergent sections 321, 323, although the rate of convergence and divergence is lower as one side of each such flow path is defined by the respective wall 283. The divergent sections 323 open onto an outlet section 278 which terminates at the outlet 275.

The bottom wall 281 of the housing 271 is formed in two sections, being a first wall section 341 and a second wall section 342. The two wall sections 341, 342 are spaced from each other so as to define a secondary inlet 343 through which seawater can directly enter the mixing zone 285. The first wall section 341 is movable relative to the second wall section 342 in order to vary the size of the opening 343. A control means 345 such as a pneumatic or hydraulic ram is provided for effecting relative movement of the first wall section 341 with respect to the second wall section 342 so as to vary the size of the opening 343.

A reversing flap 347 is associated with the outlet 275 for movement between a first position in which it is clear of the outlet 275 so as to allow normal thrust and a second position in which it extends across the outlet 275 so as to deflect sea water discharged therethrough so as to provide a reversed thrust action.

Operation of the propulsion system according to this embodiment will now be described. With a static body of seawater present in the flow passage 277, steam is injected under pressure through nozzles 289 into the mixing zone 285 in the direction towards the outlet 275. High velocity steam entering the mixing zone 285 through the nozzles 289 interacts with the seawater to transfer momentum thereto, causing a flow of sea water along the flow passage 277 from the intake 273 to the outlet 275. Additionally, the steam condenses upon exposure to the cooling influence of the seawater. It is believed that this rapid cooling action produces a rapid collapse or implosion when the steam and seawater interact. Because of the velocity at which steam is entering the mixing zone 285, a reduction in pressure develops in the mixing zone 285. The implosion extends into the convergent sections 321 of the flow paths 311.

The pressure reduction in the mixing zone 285 induces further seawater to enter the flow passage 277 through the opening 343, the volume of which can be regulated by the control means 345.

The flow of seawater also induces air into the flow passage 277 via the aeration means 301.

Aeration of the seawater produces a two-phase mixture of seawater and air which has some compressibility.

The resultant two-phase mixture flows along the flow passage and is accelerated through the convergent sections 321 of the flow paths 311 before entering divergent sections 323 where the velocity slows and the pressure increases, so as to provide enhanced thrust at the outlet 275.

Figure 18:
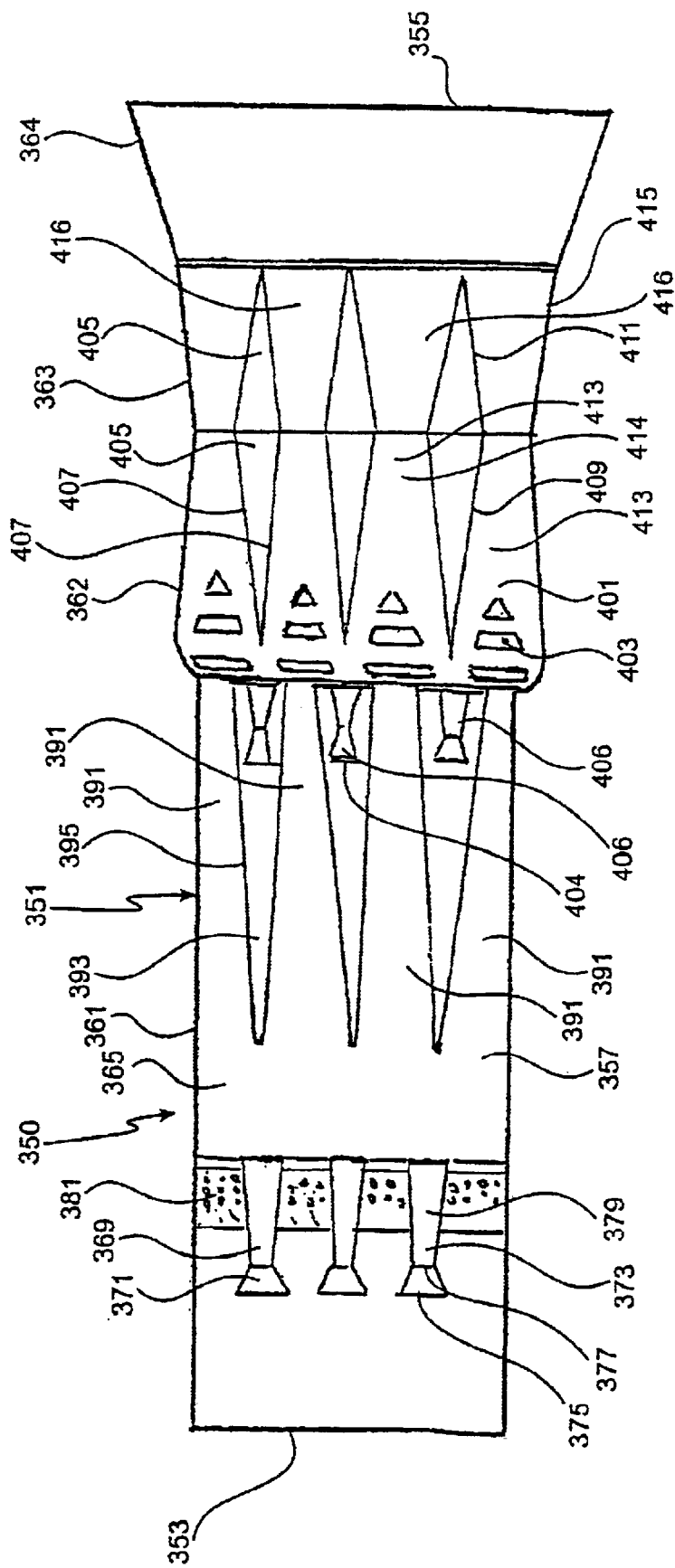
FIG. 18 is a schematic plan view of a propulsion system for a drive system according to a ninth embodiment.

Referring now to FIG. 18 of the drawings, there is shown a propulsion system according to a further embodiment which is similar to some respects to the previous embodiment 270, with the exception that there is incorporated a second stage for the purposes of further enhancing thrust developed by the propulsion system.

The propulsion system 350 comprises a housing 351 defining an intake 353 and an outlet 355, with the flow passage 357 extending between the intake 353 and the outlet 355.

The housing 351 is formed in various sections, comprising a first section 361, a second section 362, a third section 363 and a fourth section 364.

A mixing zone 365 is defined within the flow passage 357 within the first section 361.

A driving fluid injection system 369 is provided for introducing a driving fluid in the form of steam into the flow passage 357. The driving fluid injection system 369 comprises a plurality of steam injection nozzles 371 at spaced intervals across the flow passage 357, as shown in the drawing. The nozzles 371 are arranged to inject steam into the mixing zone 365 in a flow direction towards the outlet 355. Each nozzle 371 is configured as a supersonic nozzle having a nozzle passage 373 comprising a convergent section 375, a throat section 377, and a convergent section 379 opening onto the mixing zone 365.

An aeration means 381 is provided for aerating seawater flowing along the flow passage 357 from the intake 353 to the outlet 355. The aeration means 381 is of a similar construction to the aeration means in the previous embodiment.

Between the mixing zone 365 and the second housing section 362, the flow passage 357 is divided into a series of separate flow paths 391 by flow control elements 393 located within the first section 361 of the housing. The flow control elements 393 are located at spaced intervals across the flow passage 357 within the first housing section 361, as shown in FIG. 18. Each flow control element 393 has opposed longitudinal sides 395 which diverge in the direction of fluid flow so as to configure each flow path 391 as a convergent flow path.

The convergent flow paths 391 open onto a chamber 401 defined within the second housing section 362.

Openings 403 communicate with the chamber 401 for direct entrainment of additional seawater into the chamber. A control means (not shown) is provided for regulating the extent of flow through the openings 403.

Steam nozzles 406 are provided for injection supplementary steam into chamber 401 in a flow direction towards outlet 355.

Secondary flow control elements 405 are positioned within the region defined within the second and third housing sections 362 and 363 respectively.

Each secondary flow control element 405 has opposed longitudinal side walls 407 which include a diverging section 409 located in the second housing section 362 and a diverging section 411 located in the third housing section 363. With this arrangement, the secondary flow control elements 405 co-operate to establish a series of flow paths 413 within the common region between the second and third housing sections 362, 363. The flow control elements 405 co-operate to configure each flow path 413 to comprise a convergent section 414 in the second housing section 362 and a divergent section 416 in the third housing 363.

The sidewalls 415 of the second and third housing section 362, 363 are appropriately angled to complement the configuration of the flow paths 413.

The flow paths 413 open onto the fourth housing section 364 which terminates at the outlet 355. The fourth housing section 364 is configured so as to define a divergent section terminating at the outlet 355.

Operation of the propulsion system according to this embodiment will now be described. With a static volume of seawater present in the flow passage 357, steam is injected under pressure through the nozzles 373 into the mixing zone 365 in the direction towards the outlet 355. High velocity steam entering the mixing zone 365 through the nozzles 373 interacts with the seawater to transfer momentum thereto, causing a flow of sea water along the flow passage 357 from the intake 353 to the outlet 355. Additionally, the steam condenses upon exposure to the cooling influence of the seawater. A flow of seawater along the flow passage 357 from the intake 353 is established, for reasons explained in relation to the previous embodiment.

The two phase mixture resulting from aeration of the sea water flows along the passage 357 and is accelerated through the convergent flow paths 391 before entering the secondary chamber 362, where further sea water is entrained through openings 403. Additionally, supplementary steam is injected through steam nozzles 406. A secondary implosion develops in the secondary chamber 362, particularly in the converging flow paths 414. The flow is further accelerated in the converging sections 414 and then expanded in the diverging sections 416 to develop a flow of desired velocity and pressure which exits through the outlet 355 to provide thrust.

As the flow of sea water between the intake 353 and 355 is subjected to various stages of momentum transfer through contact with steam, it is believed that the energy in the steam is better utilised to develop thrust at the outlet 355 for propulsion.

In the embodiments which have been described, the propulsion system according to the invention has been applied to propulsion of water craft. Other applications are, of course, possible. One such other application is as a pump.

Figure 19:
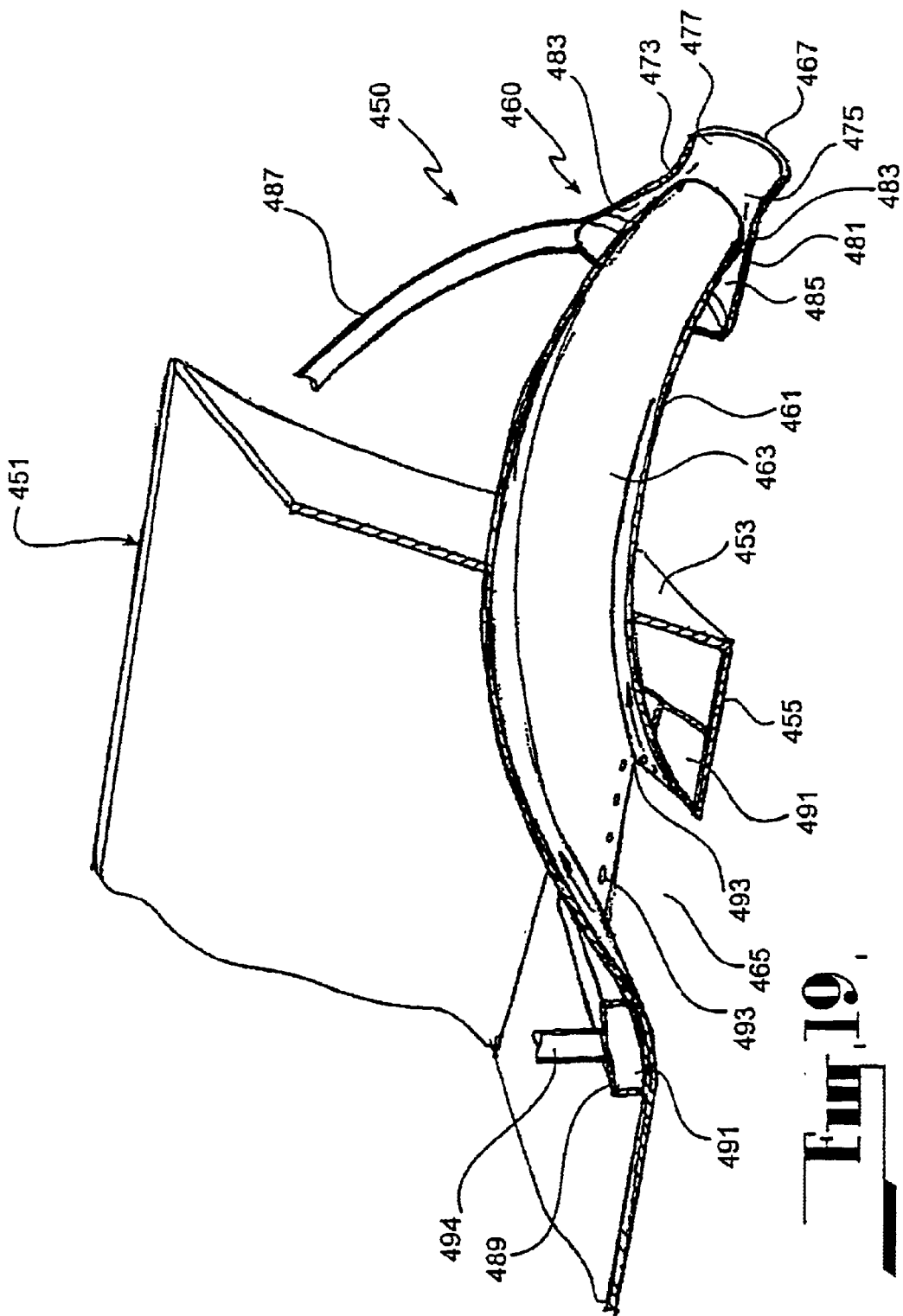
FIG. 19 is a schematic fragmentary view illustrating a drive system according to a tenth embodiment installed on a watercraft.

Referring now to FIG. 19, there is shown a drive system 450 according to a further embodiment for a boat 451 having a stern 453 and hull 455. The drive system 450 incorporates a propulsion system 460 comprising a body structure 461 defining a flow passage 463 having an intake 465 and an outlet 467.

The intake 465 opens onto the hull 455 of the boat 451 so as to be exposed to the seawater on which the boat in accommodated. The intake 465 is of generally rectangular configuration in this embodiment.

The body structure 461 comprises an eductor tube 471 extending from the intake 465. The other end of the tube 471 is of generally circular configuration and is surrounded by a shroud 473. The shroud 473 defines a mixing chamber 475 adjacent the end of the tube 471 and a diffuser section 477 which extends to, and opens onto, the outlet 467. The shroud 473 has a wall 481 which is spaced from the tube 471 such that an annular nozzle means 483 is defined through which a driving fluid in the form of steam can be injected into the mixing chamber 475. Steam is delivered to a region 485 upstream of the nozzle means 483 via a steam delivery line 487.

An aeration means 489 is provided adjacent the intake 465. The aeration means 489 comprises an aeration chamber 491 positioned around the perimeter of the intake 465 and a plurality of aeration ports 493 extending between the chamber 491 and the flow passage 463. A delivery line 494 is provided for delivering aeration gas such as air to the aeration chamber 491.

The propulsion system 460 operates in a similar fashion to embodiments described previously in that high velocity steam injected into the mixing chamber 475 through the nozzle means 483 interacts with seawater in the flow passage 461, involving a momentum transfer to the seawater causing a flow along the flow passage 461 towards the outlet 467. Additionally, the steam condenses upon exposure to the cooling influence of the seawater to produce a rapid collapse or implosion, causing a suction effect which draws seawater along the flow passage 463 from the intake 465. The injected steam tends to follow the inner surface of the shroud wall 481 by virtue of the Coanda effect which aids in reducing the skin friction against the wall surface. The aerated seawater may also have a reaction effect in the diffuser section 477 which further enhances propulsion. Forward movement of the boat 451 also assists the flow of seawater through the intake 465 and along the flow passage 463. In particular, as the bow of the boat progressively lifts with increasing boat speed, the intake 465 is increasingly exposed to oncoming seawater as the boat moves forwardly, so increasing the flow induced along the flow passage 461 by relative movement between the boat 451 and the seawater. The propulsion effect provided by the injected steam enhances the flow and provides thrust.

A particular feature of this embodiment is that the body structure 461 extends rearwardly of the stern 453 of the boat 451 and presents minimal frontal area to the oncoming water as the boat moves forwardly, so limiting the effect drag.

It has been found that good performance can be achieved by positioning the outlet 467 such that it is just below the waterline when the boat 451 is in operation. With the outlet 467 in this position, it can intermittently extend above the water line as a result of wave motion and movement of the boat 451. The intermittent exposure of the outlet 467 above the waterline has been found to be beneficial in certain operating conditions in terms of the thrust that is developed.

FIG. 20 of the drawings illustrates a propulsion system 500 according to a further embodiment utilised at a pump for pumping liquids such as water from a body 501 of such liquid contained within a reservoir 503. The propulsion system 500 is of similar construction to the propulsion system 163 according to the second embodiment, and accordingly corresponding reference numerals are used to identify corresponding parts.

The pump provided by the propulsion system 500 is incorporated in a pipeline 507 having a pipe section 509 extending between the reservoir 503 and the pump intake 175. The pipeline 507 has a further pipe section 511 extending from the pump outlet 177.

Operation of the propulsion system 500 as a pump is similar to operation of propulsion system 163, drawing a stream of liquid from the reservoir 503 and pumping it along the pipeline 507.

Where the pump is used in a fire-fighting application, the aeration gas may be a gas or gaseous mixture of a type which would assist in extinguishing the fire, such as for example an inert gas.

A particular feature of the propulsion systems according to the invention is that flow along the flow passage from the intake to the outlet is established and maintained without the use of an impeller. Furthermore, it is not necessary to provide an impeller or other mechanical device to deliver fluid to the flow passage intake. Fluid can simply be drawn through the intake. In certain applications, such as in propulsion of watercraft, fluid flow along the flow passage is supplemented by relative movement between the propulsion system and the body of fluid, with such relative movement inducing flow along the flow passage.

It should be appreciated that the scope of the invention is not limited to the scope of the embodiments described.

Throughout the specification, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. A propulsion system comprising a flow passage having an intake for communicating with a source of working fluid and outlet, a mixing zone disposed within the flow passage between the intake and the outlet, means for introducing a hot compressible driving fluid into the mixing zone, whereby interaction between the driving fluid and the working fluid in the mixing zone develops a pressure reduction in the mixing zone to cause working fluid to be drawn from said source into the mixing zone and propelled towards the outlet, and means for aerating the working fluid with an aerating gas prior to interaction of the driving fluid in the mixing zone whereby a three-phase fluid regime is created in the mixing zone by virtue of the interaction of the aerating gas, the working fluid and the driving fluid.

2. A propulsion system according to claim 1, in which the means for aerating the working fluid are prior to the introduction of the driving fluid.

3. A propulsions system according to claim 2, in which the means for aerating the working fluid are prior to the mixing zone.

4. A propulsion system according to claim 1, in which the means for introducing driving fluid comprise means for injecting the driving fluid.

5. A propulsion system according to claim 1 wherein the driving fluid is introduced in a flow direction towards the outlet.

6. A propulsion system according to claim 1 wherein the driving fluid is introduced into the mixing zone at a temperature of at least 50 C above the temperature of the working fluid.

7. A propulsion system according to claim 6 wherein the driving fluid is introduced into the mixing chamber at a temperature more than about 70° C. above the temperature of the working fluid.

8. A propulsion system according to claim 1 wherein the interaction between the driving fluid and the working fluid provides momentum transfer from the driving fluid to the working fluid.

9. A propulsion system according to claim 1 wherein the working fluid comprises a liquid.

10. A propulsion system according to claim 9 wherein the liquid comprises water.

11. A propulsion system according to claim 9 wherein contact between the driving fluid and the working fluid at the mixing zone within the flow passage causes liberation of gases from the working fluid.

12. A propulsion system according to claim 1 wherein the compressible driving fluid comprises a substantially gaseous fluid capable of rapid pressure reduction upon exposure to the cooling influence of the working liquid.

13. A propulsion system according to claim 12 wherein the driving fluid comprises a condensable vapour.

14. A propulsion system according to claim 13 wherein the condensable vapour comprises steam.

15. A propulsion system according to claim 12 wherein the driving fluid comprises exhaust gas from a combustion process.

16. A propulsion system according to claim 1 wherein the driving fluid is steam and the working fluid is water, and wherein the mass flow rates of steam to water are in a ratio ranging from about 1:10 to 1:150.

17. A propulsion system according to claim 1 wherein the aeration means comprises a plurality of aeration nozzles circumferentially spaced about and opening onto the flow passage.

18. A propulsion system according to claim 1 wherein the flow passage is configured to cause induction of the aeration gas into the flow passage.

19. A propulsion system according to claim 1 further comprising means for selectively controlling the aerating of the working fluid.

20. A propulsion system according to claim 1 wherein the aerating gas comprises air.

21. A propulsion system according to claim 1 wherein the working fluid comprises water and the aerating gas comprises air, and wherein the ratio of air to water is not more than about 1:10 by volume.

22. A propulsion system according to claim 21 wherein the ratio of air to water is about 1:300.

23. A propulsion system according to claim 1 wherein a section of the flow passage between the intake and the mixing zone defines an intake passage terminating at a discharge opening from which the working fluid expands upon entry into the mixing zone.

24. A propulsion system according to claim 23 wherein the discharge opening has a cross-sectional area smaller than the cross-sectional area of the mixing zone at the location where the discharge opening opens onto the mixing zone.

25. A propulsion system according to claim 1 wherein the mixing zone progressively contracts in the direction of fluid flow therethrough.

26. A propulsion system according to claim 25 wherein the mixing zone contracts to a size creating a choked flow condition in the flow passage.

27. A propulsion system according to claim 1 wherein the means for introducing driving fluid comprises a nozzle means through which the driving fluid is introduced into the mixing zone.

28. A propulsion system according to claim 27 wherein the nozzle means is disposed adjacent a boundary surface of the flow passage.

29. A propulsion system according to claim 28 wherein the nozzle means extends around a perimeter of the flow passage.

30. A propulsion system according to claim 27 wherein the nozzle means comprises a nozzle passage.

31. A propulsion system according to claim 30 wherein the nozzle passage of annular configuration.

32. A propulsion system according to claim 31 wherein the annular nozzle passage is defined between first and second members within which the flow passage is defined, the first and second members being selectively movable with respect to each other for varying the size of the nozzle flow passage.

33. A propulsion system according to claim 32 wherein the first member defines the mixing zone and the second member defines the intake passage opening onto the mixing zone, the annular nozzle passage being disposed around the discharge opening of the intake passage.

34. A propulsion system according to claim 30 wherein the nozzle passage configured as a slit.

35. A propulsion system according to claim 34 wherein the nozzle passage is defined between two spaced apart elongate nozzle elements.

36. A propulsion system according to claim 35 wherein the two nozzle elements are movable relative to each other for selectively varying the size of the nozzle passage therebetween.

37. A propulsion system according to claim 36 further comprising a nozzle control means operable to move the nozzle sections relative to each other.

38. A propulsion system according to claim 27 wherein the nozzle means comprises a supersonic nozzle.

39. A propulsion system according to claim 30 wherein the nozzle passage has a boundary wall defined by a surface extending beyond the nozzle passage to provide a guide surface along which driving fluid issuing from the nozzle passage can flow.

40. A propulsion system according to claim 39 wherein said surface extends beyond the nozzle passage to define a boundary wall of the mixing zone.

41. A propulsion system according to claim 27 wherein the nozzle means comprises axially spaced nozzles.

42. A propulsion system according to claim 1 wherein the flow passage comprises an outlet section terminating at the outlet, the outlet being configured as a diffuser.

43. A propulsion system according to claim 1 wherein the flow passage comprises a portion defined between two opposed surfaces at least one of which is selectively movable relative to the other for varying the cross-sectional area of the portion of the flow passage defined therebetween.

44. A propulsion system according to claim 43 wherein said portion of the fluid flow passage includes said outlet section.

45. A propulsion system according to claim 43 wherein the two opposed surfaces are substantially planar surfaces.

46. A propulsion system according to claim 43 wherein the two opposed surfaces are angularly movable relative to each other.

47. A propulsion system according to claim 43 further comprising an outlet control means operable to control relative movement between the two opposed surfaces.

48. A propulsion system according to claim 1 further comprising means for selectively diverting the driving fluid to cause flow thereof in a reverse direction along the flow passage for discharge outwardly through the intake.

49. A propulsion system according to claim 1 further comprising means operable to selectively vary the size of the intake.

50. A propulsion system according to claim 1 wherein the intake and the outlet are of substantially the same cross-sectional flow area.

51. A propulsion system according to claim 50 wherein the flow passage is of substantially the same cross-sectional flow area throughout the length thereof between the intake and the outlet.

52. A propulsion system comprising a flow passage having an intake for communicating with a source of working liquid and an outlet, a mixing zone disposed within the flow passage between the intake and outlet, aeration means for aerating the working liquid with an aerating gas before delivery thereof to the mixing chamber, and a nozzle means for introducing a jet of hot compressible driving fluid into the mixing zone in a flow direction towards the outlet whereby a three-phase fluid regime is created in the mixing zone by virtue of the interaction of the aerating gas, the working liquid and the driving fluid, and whereby interaction between the driving fluid and the working liquid in the mixing zone develops a pressure reduction relative to the intake pressure to cause working liquid to be drawn from said source into the mixing zone and propelled towards the outlet.

53. A propulsion system comprising a flow passage having an intake for communicating with a source of working fluid and an outlet, a mixing zone disposed within the flow passage between the intake and outlet, and a nozzle means for injecting a condensable vapour into the nixing zone in a flow direction towards the outlet, whereby interaction between the condensable vapour and the working liquid in the mixing zone causes the vapour to condense providing a volume reduction to create a suction effect to cause working liquid to be drawn from said source into the mixing zone and propelled towards the outlet, and means for aerating the working fluid with an aerating gas prior to interaction of the driving fluid in the mixing zone whereby a three-phase fluid regime is created in the mixing zone by virtue of the interaction of the aerating gas, the working fluid and the condensable vapour.

54. A propulsion system according to claim 52 wherein the condensable vapour comprises steam.

55. A propulsion system according to claim 53 wherein the working fluid comprises a liquid.

56. A propulsion system for a watercraft accommodated on or in a body of water, the propulsion system comprising a flow passage having an intake for communicating with the body of water and an outlet, a mixing zone disposed within the flow passage between the intake and outlet whereby a stream of water drawn from the body of water through the intake as a working fluid can enter the mixing zone, and an injection means for injecting a hot compressible driving fluid into the mixing zone in a flow direction towards the outlet, whereby interaction between the driving fluid and the water in the mixing zone develops a zone of reduced pressure to cause a stream of water to be drawn from the body of water into the mixing zone and propelled towards the outlet, and means for aerating the water with an aerating gas prior to interaction of the driving fluid in the mixing zone whereby a three-phase fluid regime is created in the mixing zone by virtue of the interaction of the aerating gas, the water and the driving fluid.

57. A propulsion system according to claim 1 wherein the flow passage is devoid of any obstruction therein likely to substantially impede flow through the flow passage.

58. A propulsion system according to claim 1 wherein a flow control device is located in the mixing zone.

59. A propulsion system according to claim 1 wherein the driving fluid is introduced into an inner region of the working fluid flow.

60. A propulsion system according to claim 59 wherein the nozzle means opens into the flow passage inwardly of a boundary wall thereof.

61. A propulsion system according to claim 1 further comprising means for admission of further working fluid into the flow passage after introduction of the driving fluid thereinto, which further working fluid is entrained in the flow along the flow passage.

62. A propulsion system according to claim 61 where the means for admission of further working fluid comprises at least one opening providing direct communication between the source of working fluid and the flow passage.

63. A propulsion system for a watercraft accommodated on or in a body of water, the propulsion system comprising a flow passage having an intake for communicating with the body of water and an outlet, a mixing zone disposed within the flow passage between the intake and outlet whereby a stream of water drawn from the body of water through the intake can enter the mixing zone, and for introducing a hot compressible driving fluid into the mixing zone, whereby interaction between the driving fluid and the water in the mixing zone develops a zone of reduced pressure to cause a stream of water to be drawn from the body of water into the mixing zone and propelled towards the outlet, and means for aerating the working fluid with an aerating gas prior to interaction of the driving fluid in the mixing zone whereby a three-phase fluid regime is created in the mixing zone by virtue of the interaction of the aerating gas, the water and the driving fluid, the propulsion system being devoid of an impeller or other mechanical device for generating fluid flow along the flow passage to provide thrust at the outlet.

64. A watercraft having a propulsion system according to claim 1.

65. A watercraft according to claim 64 wherein the intake and outlet are each positioned as to in use open into the body of water on or in which the watercraft is accommodated.

66. A watercraft according to claim 65 wherein the outlet is so positioned that it is intermittently exposed above the water surface during forward propulsion of the watercraft.

67. A watercraft according to claim 64 wherein the outlet is positioned to discharge driving fluid therefrom at a location underneath the hull of the watercraft.

68. A drive system for a watercraft, the drive system comprising a propulsion system according to claim 1.

69. A drive system for a watercraft adapted to be accommodated on or in a body of water, the drive system comprising a steam generator for generating a supply of steam, and a propulsion system, the propulsion system comprising a flow passage having an intake for communicating with the body of water and an outlet, a mixing zone disposed within the flow passage between the intake and the outlet whereby a stream of water drawn from the body of water through the intake can enter the mixing zone, and an injection means for injecting steam generated by the steam generator into the mixing zone in a flow direction towards the outlet, whereby interaction between the steam and the water in the mixing zone causes water to be drawn from the body of water into the mixing zone and propelled towards the outlet, and means for aerating the water with an aerating gas prior to interaction of the steam in the mixing zone whereby a three-phase fluid regime is created in the mixing zone by virtue of the interaction of the aerating gas, the water and the steam.

70. A drive system according to claim 69 further comprising a heat recovery system adapted to recover remnant heat in the body of water arising from contact with the steam.

71. A drive system according to claim 69 wherein the steam generator comprises a boiler adapted to generate heat from combustion of a fuel, the heat recovery means being adapted to also recover at least some remnant heat in combustion gases from the boiler.

72. A method of generating a fluid flow comprising the steps of: providing a flow passage having an intake and an outlet, locating the intake of the flow passage to communicate with a source of primary fluid from which the fluid flow is to be established; and introducing a driving fluid into the flow passage for interacting with primary fluid in the flow passage to develop a pressure reduction at a zone in the flow passage to cause primary fluid to be drawn from said source into said zone and propelled towards the outlet; and further comprising the step of aerating the primary fluid with an aerating gas prior to the introduction of the driving fluid into the primary fluid whereby a three-phase fluid regime is created in the flow passage by virtue of the interaction of the aerating gas, the primary fluid and the driving fluid.

73. A method of generating a fluid flow comprising the steps of: providing a flow passage having an intake and an outlet; locating the intake of the flow passage to communicate with a source of fluid from which the fluid flow is to be established; and injecting a condensable vapour into the flow passage for interacting with fluid therein to provide a volume reduction upon condensation of the vapour to create a suction effect at a zone in the flow passage to cause fluid to be drawn from said source into said zone and propelled towards the outlet; and further comprising the step of aerating the fluid with an aerating gas prior to the introduction of the condensable vapour into the fluid whereby a three-phase fluid regime is created in the flow passage by virtue of the interaction of the aerating gas, the fluid and the condensable vapour.

74. A method of propelling a watercraft through a body of water, the method comprising the steps of: providing the watercraft with a flow passage having an intake and an outlet both opening onto the body of water; and introducing a driving fluid into the flow passage to develop a pressure reduction at a zone in the flow passage to cause water from the body of water to be drawn through the inlet into said zone and propelled towards the outlet as a stream for propelling the watercraft; and further comprising the step of aerating the water with an aerating gas prior to the introduction of the driving fluid into the water whereby a three-phase fluid regime is created in the flow passage by virtue of the interaction of the aerating gas, the water and the driving fluid.

75. A method of propelling a watercraft through a body of water, the method comprising the steps of: providing the watercraft with a flow passage having an intake and an outlet both opening onto the body of water; and introducing a condensable vapour such as steam into the flow passage to provide a volume reduction upon condensation of the vapour and thereby create a suction effect at a zone in the flow passage to cause water from the body of water to be drawn through the inlet into said zone and propelled towards the outlet as a stream for propelling the watercraft; and further comprising the step of aerating the water with an aerating gas prior to the introduction of the condensable vapour into the water whereby a three-phase fluid regime is created in the flow passage by virtue of the interaction of the aerating gas, the water and the condensable vapour.

76. A pump comprising a propulsion system according to claim 1.

77. A propulsion system according to claim 1, comprising a system for recovering heat from a heat source, the heat recovery system comprising a refrigerant circuit having a heat exchanger exposed to the heat source for extracting heat therefrom to vapourise a refrigerant in the refrigerant circuit, and means associated with the refrigerant circuit for converting heat energy in the vapourised refrigerant to torque.

78. A drive system for a watercraft accommodated on or in a body of water, the drive system comprising a propulsion system according to claim 14, a boiler for generating a supply of steam, the boiler having a combustion chamber and an exhaust passage along which exhaust gases from the combustion chamber are discharged, and a heat recovery system for recovering remnant heat in the exhaust gases, the heat recovery system comprising a refrigerant circuit having a heat exchanger exposed to the exhaust passage for extracting heat from the exhaust gases to vapourise a refrigerant in the refrigerant circuit, and means associated with the refrigerant circuit for converting heat energy in the vapourised refrigerant to torque.

79. A drive system for a watercraft accommodated on or in a body of water, the drive system comprising a propulsion system according to claim 14, and a heat recovery system for recovering remnant heat in the water flowing along the flow passage after the introduction of steam into the water, the heat recovery system comprising a refrigerant circuit having a heat exchanger exposed to the flow passage for extracting heat from water flowing along the flow passage to vapourise a refrigerant in the refrigerant circuit, and means associated with the refrigerant circuit for converting heat energy in the vapourised refrigerant to torque.

80. A drive system for a watercraft accommodated on or in a body of water, the drive system comprising a boiler for generating a supply of steam, the boiler having a combustion chamber and an exhaust passage along which exhaust gases from the combustion chamber are discharged, a propulsion system according to claim 14, and a heat recovery system for recovering remnant heat in the exhaust gases and in the water flowing along the flow passage after introduction of steam into the water, the heat recovery system comprising a refrigerant circuit having a heat exchanger exposed to the exhaust passage and the flow passage for extracting heat from the exhaust gases and the water respectively to vapourise a refrigerant in the refrigerant circuit, and means associated with the refrigerant circuit for converting heat energy in the vapourised refrigerant to torque.

81. A drive system according to claim 80 wherein the refrigerant circuit includes an evaporator having a first portion thereof exposed to the exhaust passage for extracting heat from the combustion gases passing therealong and a second portion exposed to the flow passage for extracting heat from water flowing therealong.

82. A nozzle means in accordance with a propulsion system according to claim 1 having an inlet, an outlet and a flow passage extending between the inlet and the outlet, characterised in that the size of the flow passage is selectively variable.

83. A nozzle means according to claim 82 comprising a convergent section, a throat section and a divergent section, the convergent section extending from the inlet to the throat section and the divergent section extending from the throat section to the outlet.

84. A nozzle means according to claim 82 comprising a nozzle structure having two elongate elements between which the nozzle passage is defined.

85. A nozzle means according to claim 84 wherein the two nozzle elements are movable relative to each other for selectively varying the size of the flow passage therebetween.

86. A propulsion system comprising a flow passage having an intake for communication with a source of working fluid and an outlet, a mixing zone disposed within the fluid passage between the intake and the outlet, a nozzle means for introducing a jet of driving fluid into the mixing zone in a flow direction towards the outlet, whereby interaction between the driving fluid and the working fluid in the mixing zone causes working fluid to be drawn from the source into the mixing zone and propelled towards the outlet, the nozzle means having a nozzle passage of selectively variable size, and means for aerating the working fluid with an aerating gas prior to interaction of the driving fluid in the mixing zone whereby a three-phase fluid regime is created in the mixing zone by virtue of the interaction of the aerating gas, the working fluid and the driving fluid.

87. A drive system for a watercraft adapted to be accommodated on or in a body of water, the propulsion system comprising a flow passage having an intake for communicating with the body of water and an outlet, a mixing zone disposed within the flow passage between the intake and the outlet whereby a stream of water drawn from the body of water through the intake can enter the mixing zone, and a nozzle means for introducing a jet of driving fluid into the mixing zone in the flow direction towards the outlet, whereby interaction between the driving fluid and water causes water to be drawn through the intake from the body of water and propelled towards the outlet, the nozzle means having a nozzle passage of selectively variable size, and means for aerating the working fluid with an aerating gas prior to interaction of the driving fluid in the mixing zone whereby a three-phase fluid regime is created in the mixing zone by virtue of the interaction of the aerating gas, the water and the driving fluid.

88. A drive system for a watercraft adapted to be accommodated on or in a body of water, the drive system comprising a steam generator for generating a supply steam, a propulsion system comprising a flow passage having an intake for communication with the body of water and an outlet, a mixing zone disposed within the flow passage between the intake and outlet whereby a stream of water drawn from the body of water through the intake can enter the mixing zone, and a steam nozzle means for introducing steam into the mixing zone in a flow direction towards the outlet, whereby interaction between the steam and the water causes water to be drawn into the flow passage through the intake and propelled towards the outlet, the steam nozzle means having a flow passage of selectively variable size, and means for aerating the working fluid with an aerating gas prior to interaction of the driving fluid in the mixing zone whereby a three-phase fluid regime is created in the mixing zone by virtue of the interaction of the aerating gas, the water and the steam.

\* \* \* \* \*